United States Patent
Yoda

(10) Patent No.: US 11,451,737 B2
(45) Date of Patent: Sep. 20, 2022

(54) IMAGING DEVICE

(71) Applicant: SONY SEMICONDUCTOR SOLUTIONS CORPORATION, Kanagawa (JP)

(72) Inventor: Koji Yoda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/046,892

(22) PCT Filed: Apr. 9, 2019

(86) PCT No.: PCT/JP2019/015456
§ 371 (c)(1),
(2) Date: Oct. 12, 2020

(87) PCT Pub. No.: WO2019/208204
PCT Pub. Date: Oct. 31, 2019

(65) Prior Publication Data
US 2021/0377485 A1 Dec. 2, 2021

(30) Foreign Application Priority Data
Apr. 24, 2018 (JP) .............................. JP2018-083165

(51) Int. Cl.
*H04N 5/76* (2006.01)
*H04N 5/765* (2006.01)
(Continued)

(52) U.S. Cl.
CPC .......... *H04N 5/765* (2013.01); *G06V 10/147* (2022.01); *H04N 5/345* (2013.01); *H04N 5/376* (2013.01);
(Continued)

(58) Field of Classification Search
CPC ..................................................... H04N 5/765
(Continued)

(56) References Cited

U.S. PATENT DOCUMENTS

2007/0024904 A1 2/2007 Baer et al.
2009/0109311 A1* 4/2009 Mabuchi ................ H04N 5/341
348/302

(Continued)

FOREIGN PATENT DOCUMENTS

DE 102006017251 A1 2/2007
EP 3174286 A1 5/2017
(Continued)

OTHER PUBLICATIONS

Extended European Search Report of EP Application No. 19792858.3, dated May 7, 2021, 10 pages.
(Continued)

*Primary Examiner* — Joel W Fosselman
(74) *Attorney, Agent, or Firm* — Chip Law Group

(57) ABSTRACT

Provided is an imaging device that includes a plurality of pixels, a memory unit, a memory control unit, and a bus interface. Each of the memory unit, the plurality of pixels, the memory control unit, and the bus interface is in any one of a plurality of semiconductor substrates. The plurality of pixels performs photoelectric conversion. The memory unit stores image data generated on the basis of a result of the photoelectric conversion. The memory control unit performs a read operation on the basis of first internal address information. The read operation is for reading, from the memory unit, image data corresponding to the first internal address information among pieces of the image data. The bus interface performs communication for first address information with an external device, supplies the memory control
(Continued)

unit with the first internal address information, and transmits the read image data to the external device.

21 Claims, 34 Drawing Sheets

(51) Int. Cl.
*H04N 5/369* (2011.01)
*H04N 5/345* (2011.01)
*H04N 5/376* (2011.01)
*H04N 5/91* (2006.01)
*H04N 9/04* (2006.01)
*G06V 10/147* (2022.01)
*B60W 60/00* (2020.01)
*B60W 10/18* (2012.01)
*B60W 10/20* (2006.01)
*G06V 20/56* (2022.01)
*G06V 20/59* (2022.01)

(52) U.S. Cl.
CPC ............... *H04N 5/379* (2018.08); *H04N 5/91* (2013.01); *H04N 9/045* (2013.01); *B60W 10/18* (2013.01); *B60W 10/20* (2013.01); *B60W 60/001* (2020.02); *B60W 2420/42* (2013.01); *G06V 20/56* (2022.01); *G06V 20/597* (2022.01)

(58) Field of Classification Search
USPC ...................................................... 348/222.1
See application file for complete search history.

(56) References Cited

U.S. PATENT DOCUMENTS

| | | | |
|---|---|---|---|
| 2017/0150042 | A1 | 5/2017 | Suzuki et al. |
| 2017/0317061 | A1 | 11/2017 | Takahashi et al. |

FOREIGN PATENT DOCUMENTS

| | | | |
|---|---|---|---|
| GB | 2428931 | A | 2/2007 |
| JP | 08-32853 | A | 2/1996 |
| JP | 08-032853 | A | 2/1996 |
| JP | 3467845 | B2 | 11/2003 |
| JP | 2007-037112 | A | 2/2007 |
| JP | 2009-111666 | A | 5/2009 |
| JP | 4420101 | B2 | 2/2010 |
| JP | 2016-187071 | A | 10/2016 |
| JP | 2017-224974 | A | 12/2017 |
| JP | 2018-083165 | A | 5/2018 |
| WO | 2016/098691 | A1 | 6/2016 |

OTHER PUBLICATIONS

International Search Report and Written Opinion of PCT Application No. PCT/JP2019/015456, dated Jun. 25, 2019, 10 pages of ISRWO.

* cited by examiner

[FIG. 1]
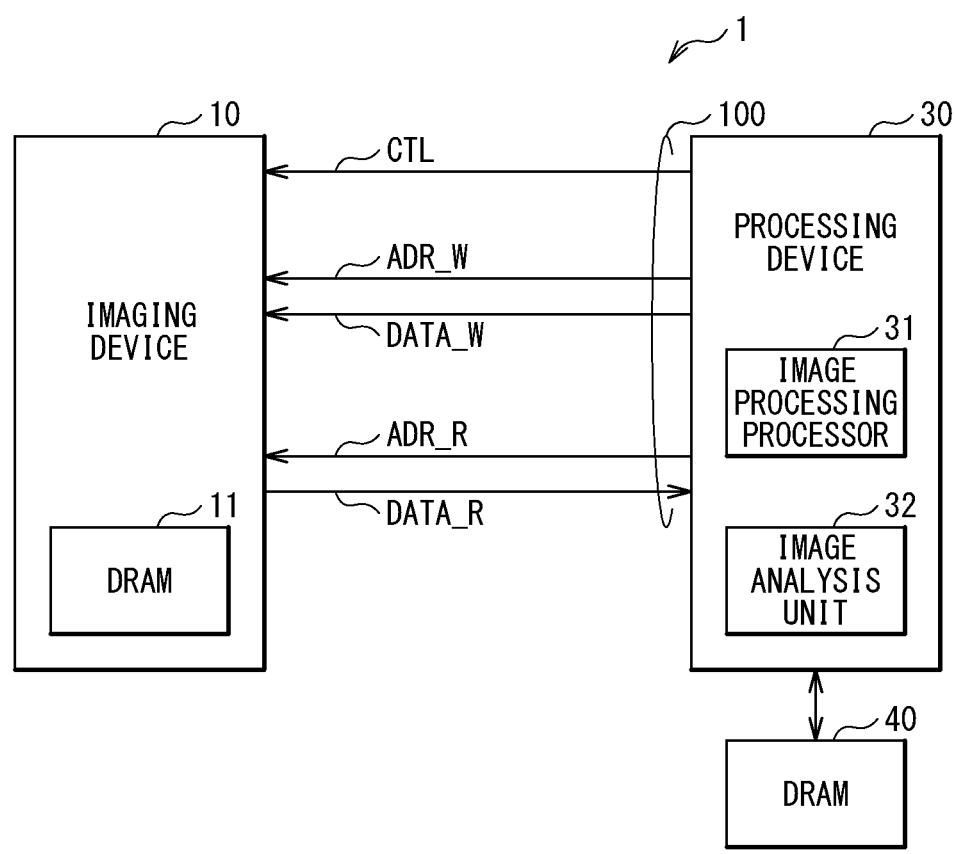

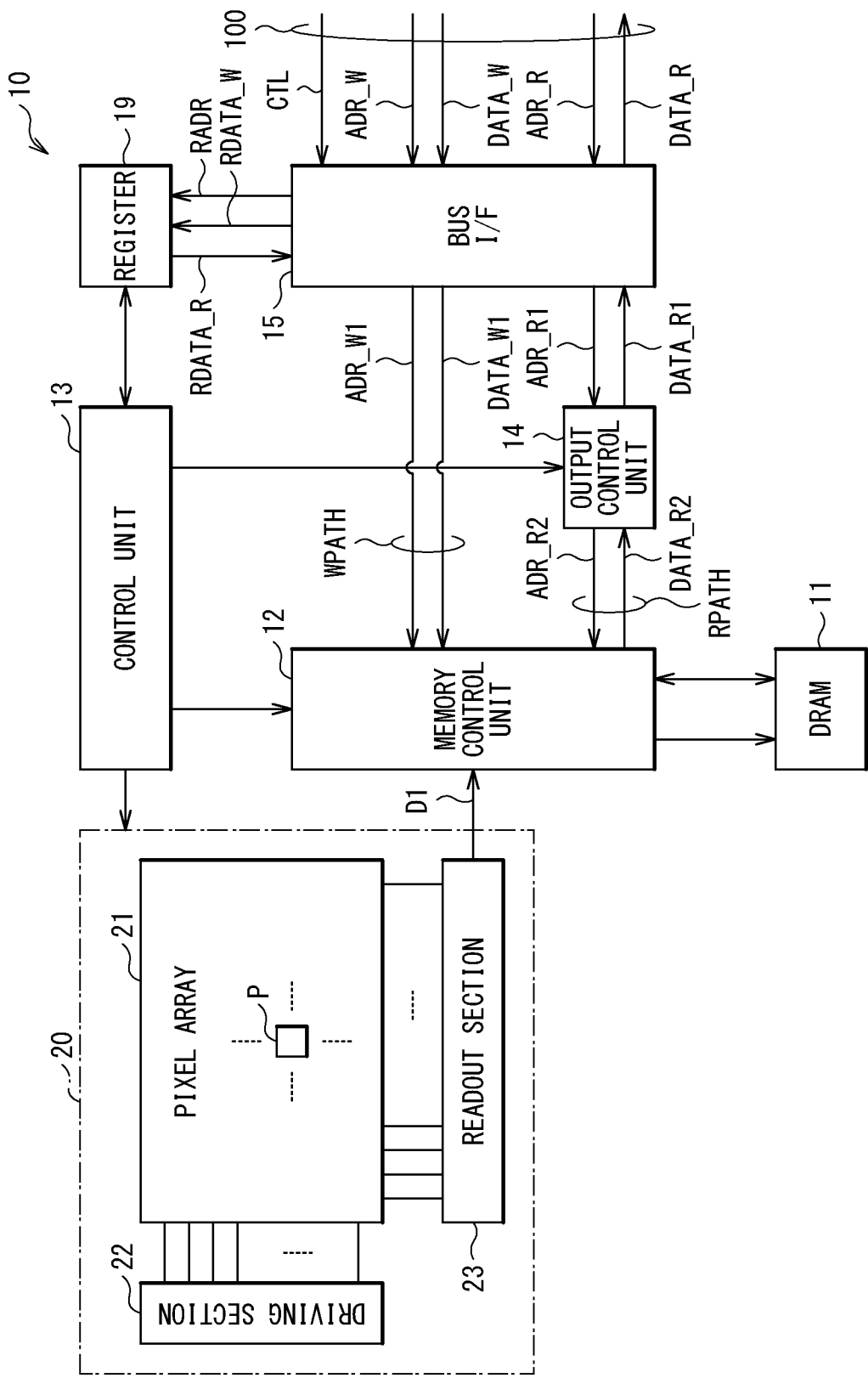
[FIG. 2]

[FIG. 3]
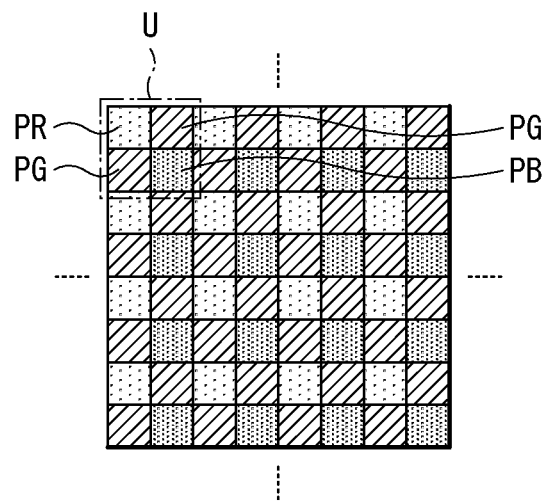
[FIG. 4]
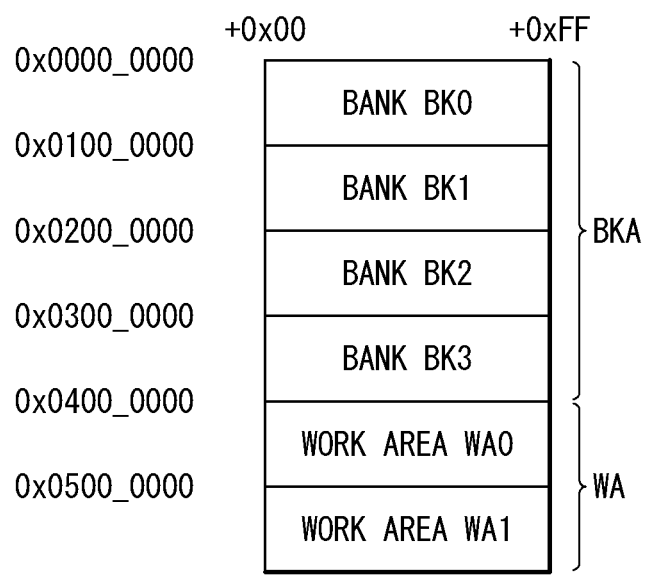

[FIG. 5]
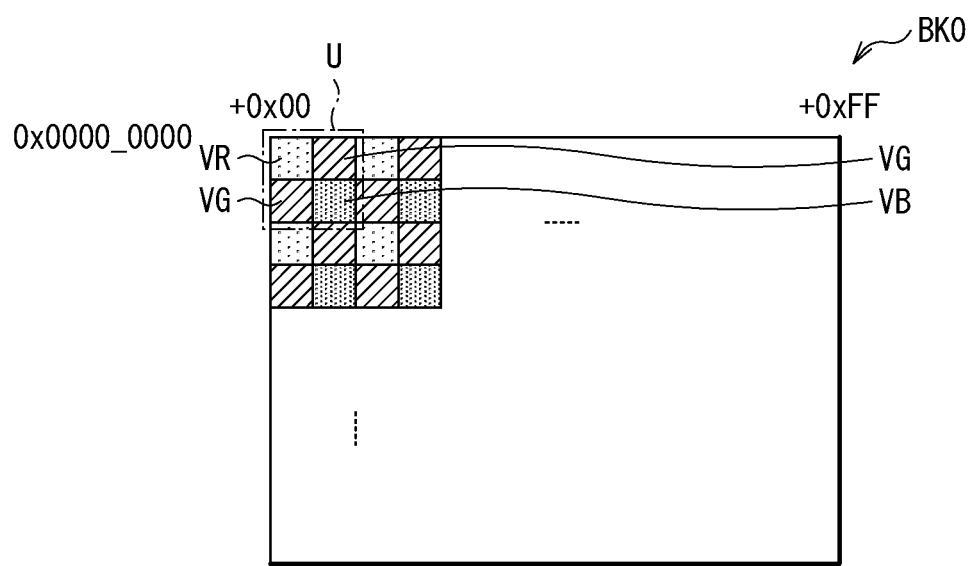

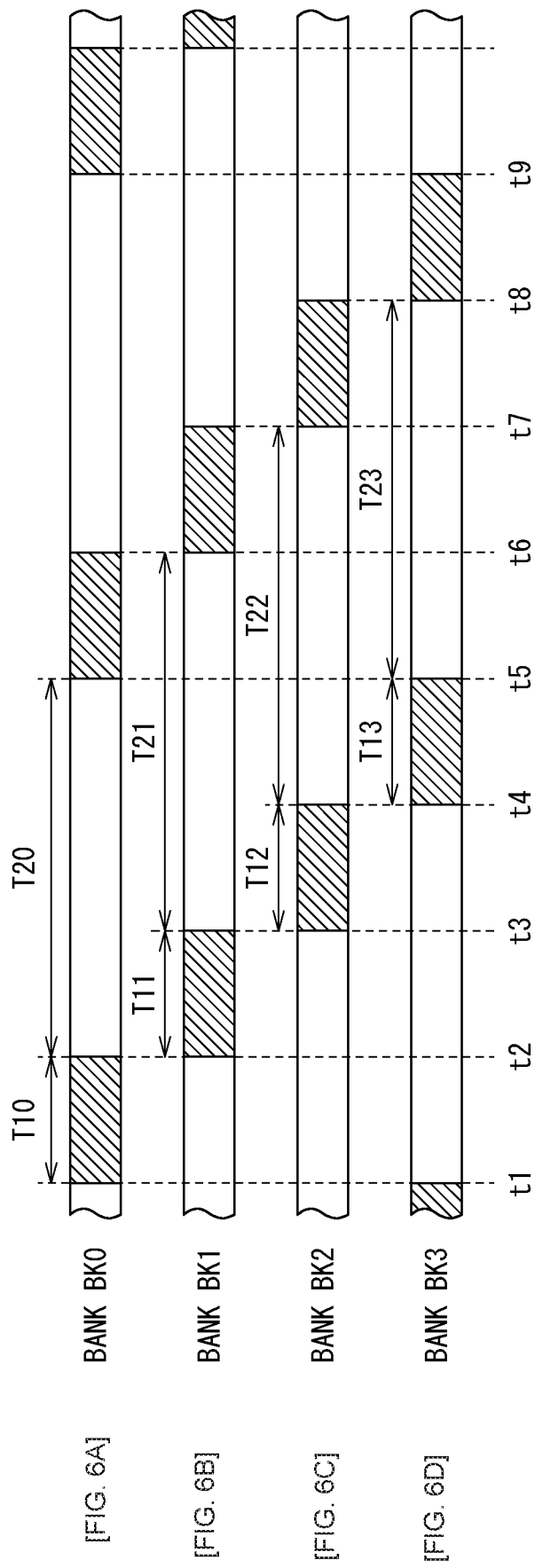

[FIG. 7]
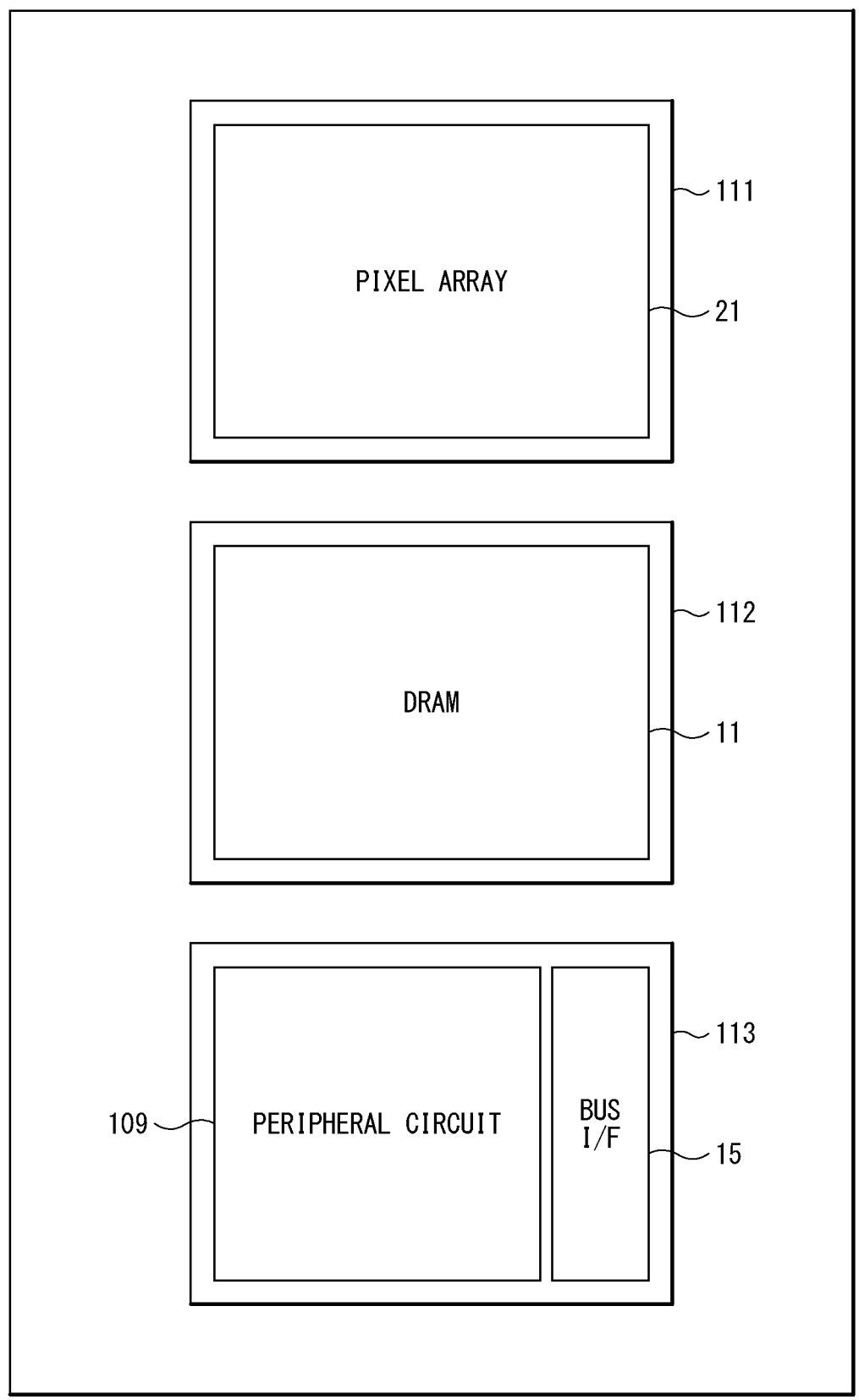

[FIG. 8]
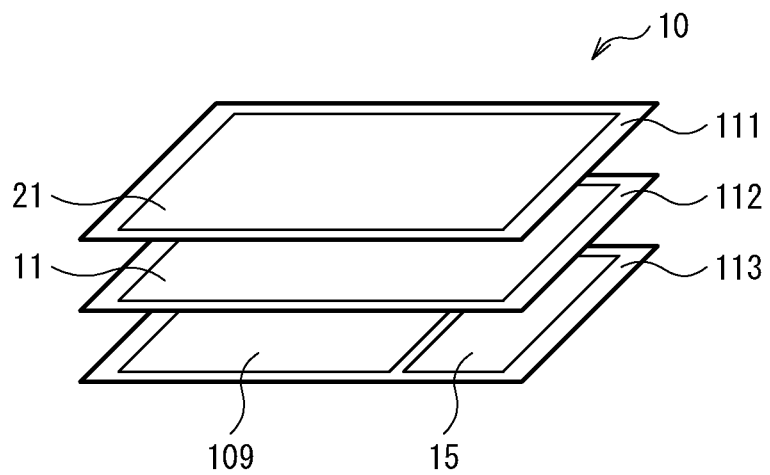

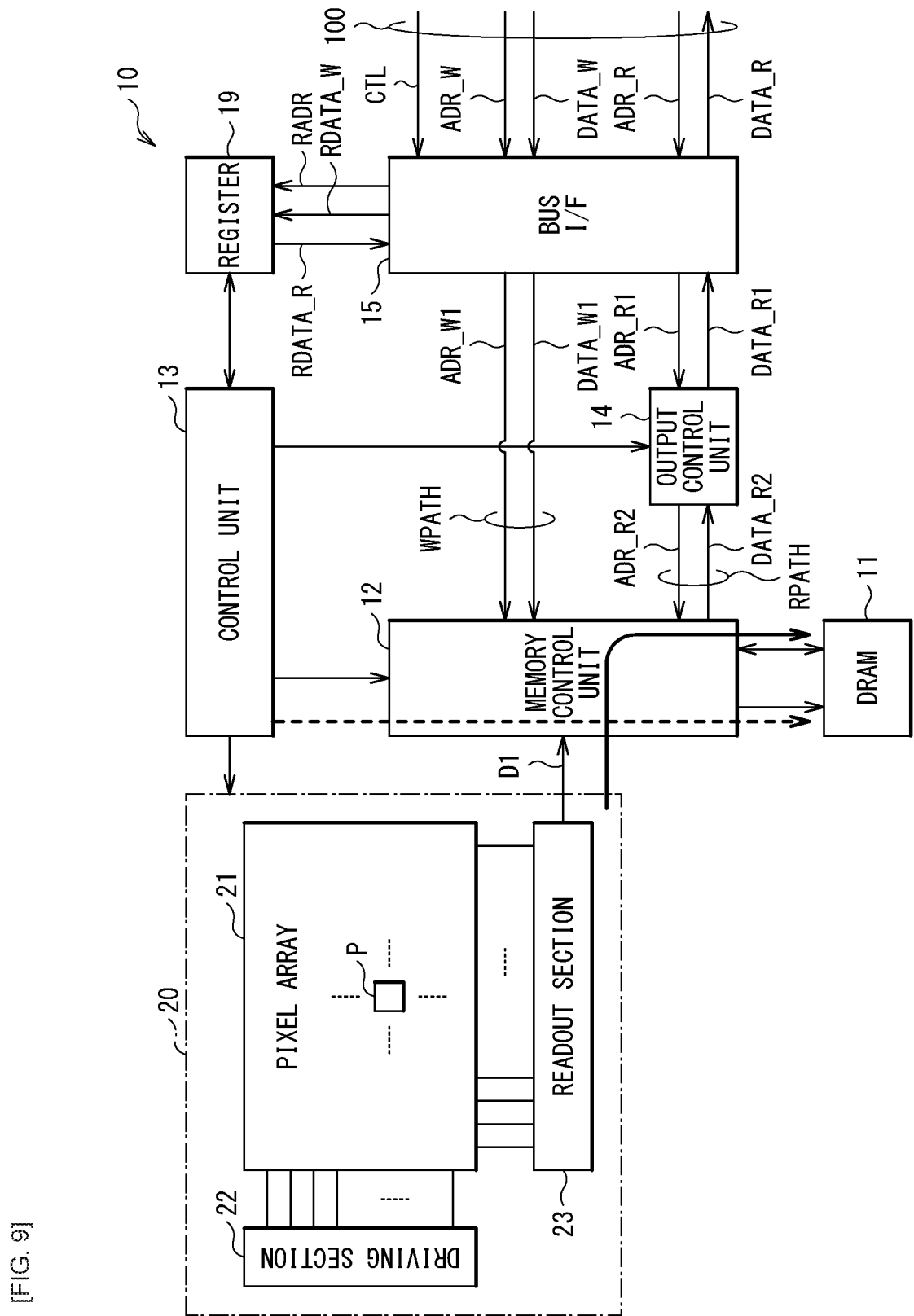
[FIG. 9]

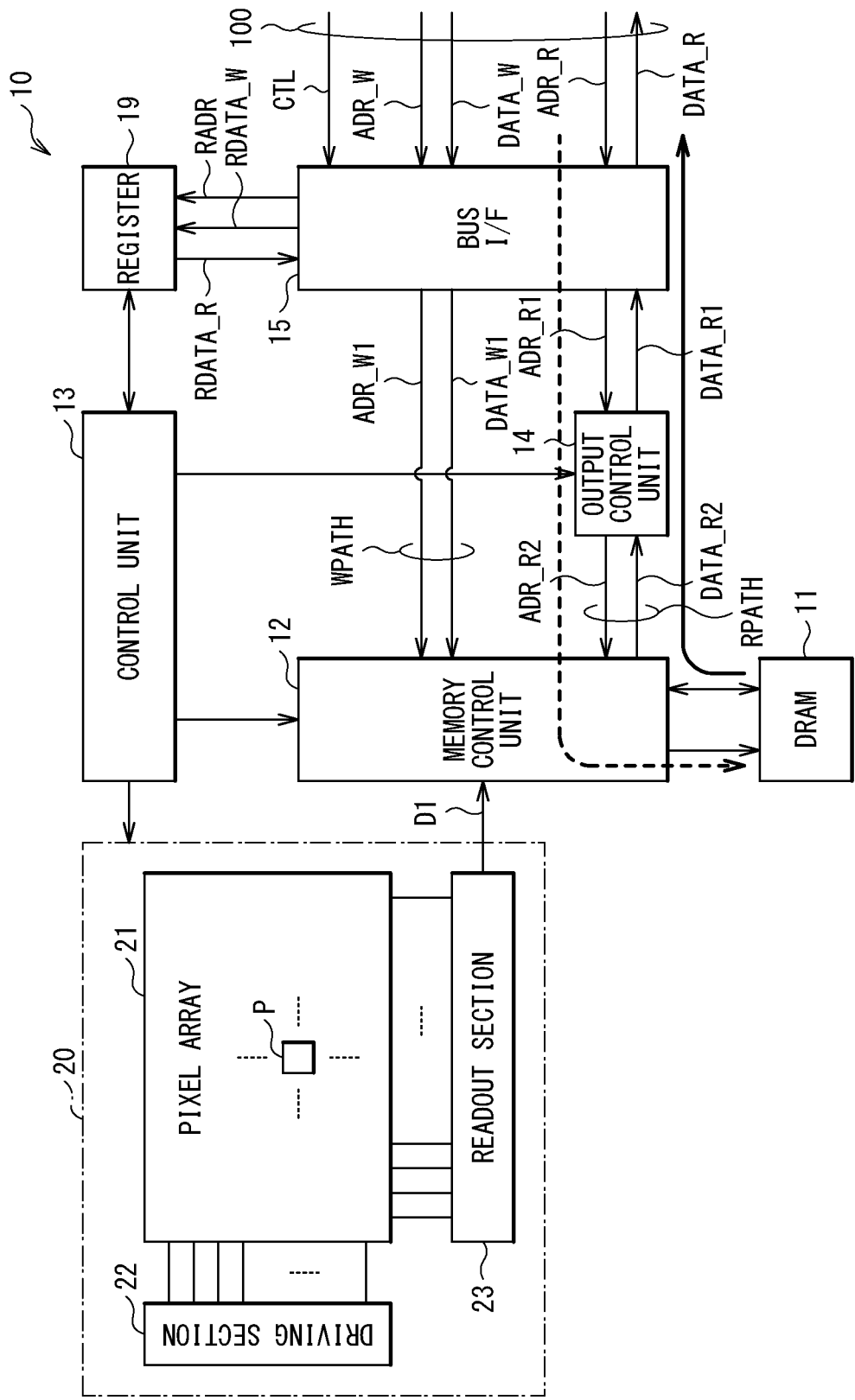
[FIG. 10]

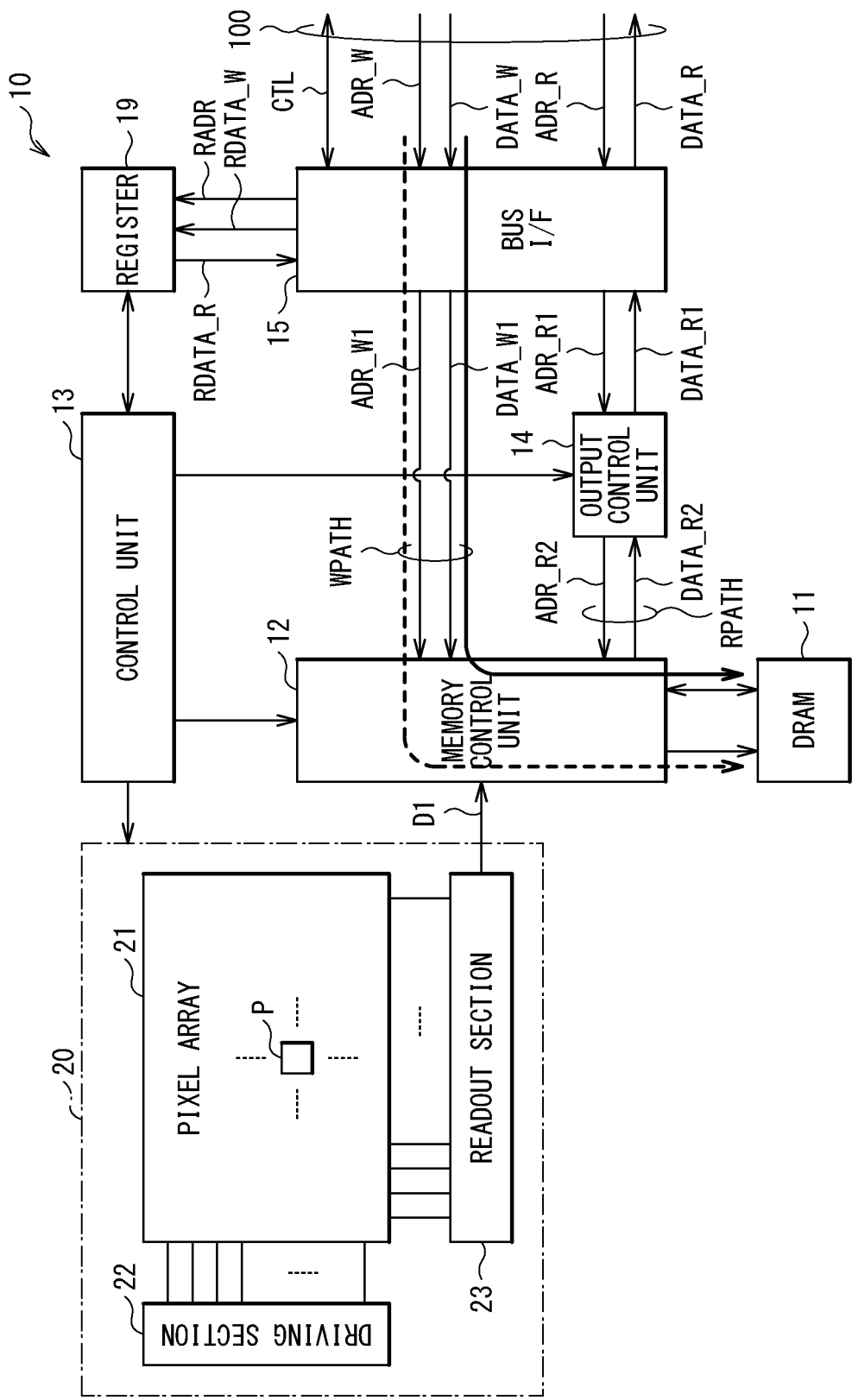
[FIG. 11]

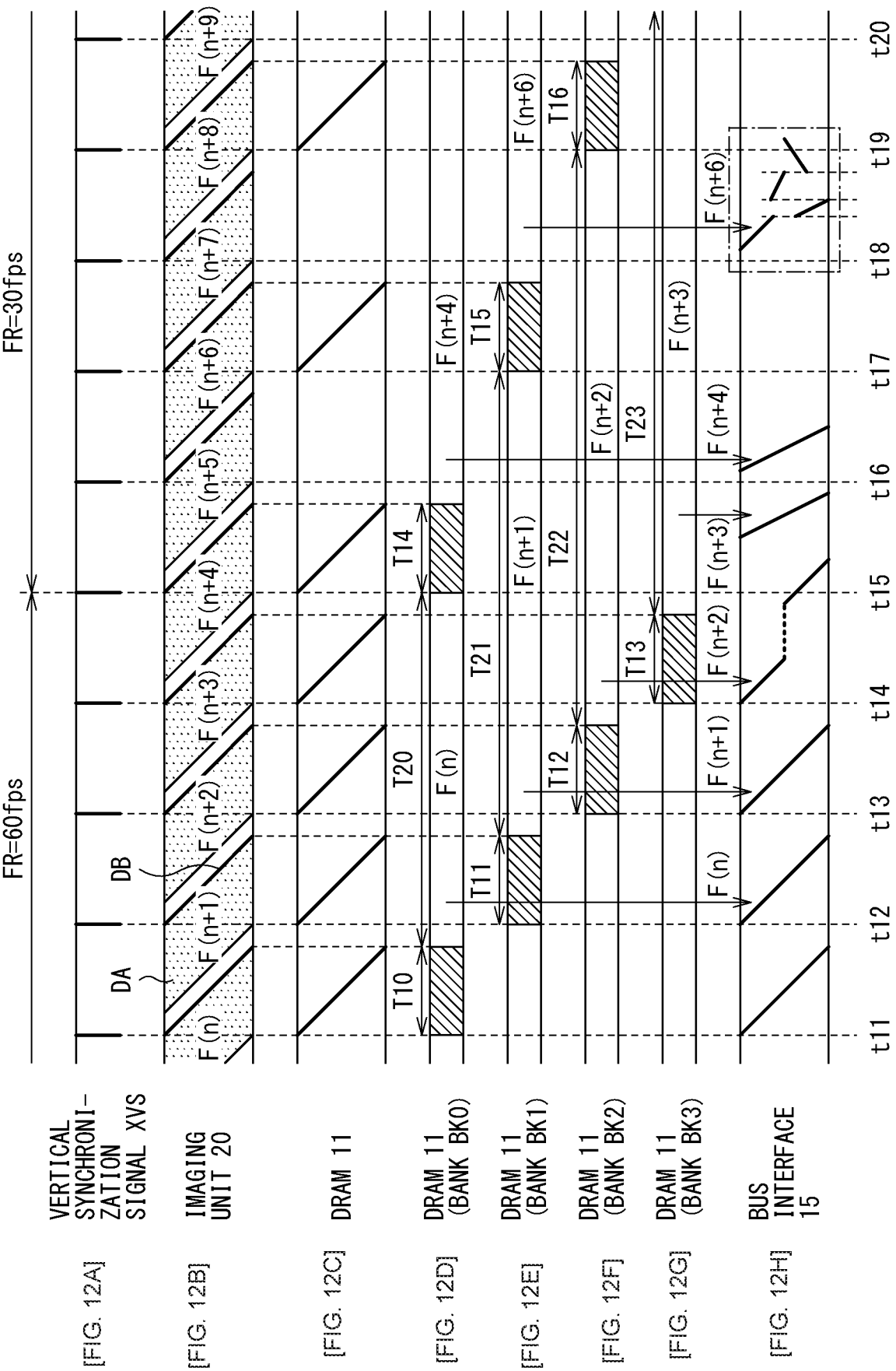

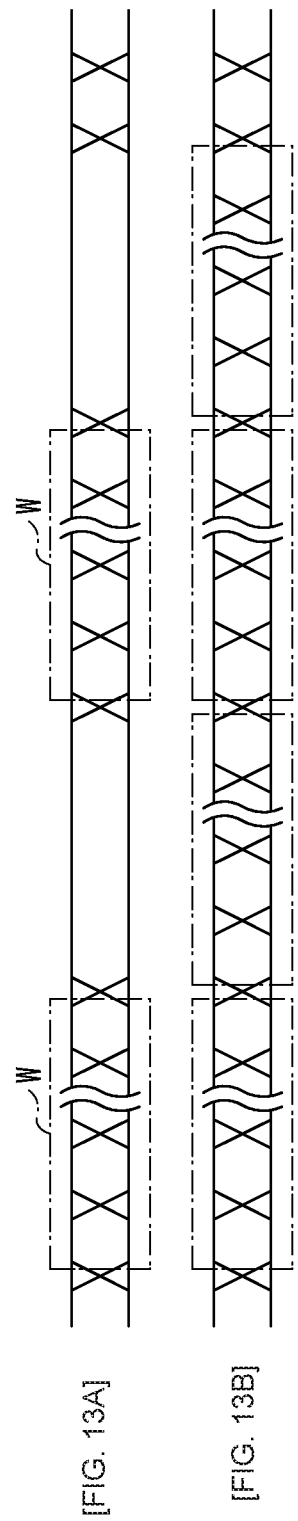

[FIG. 14A]
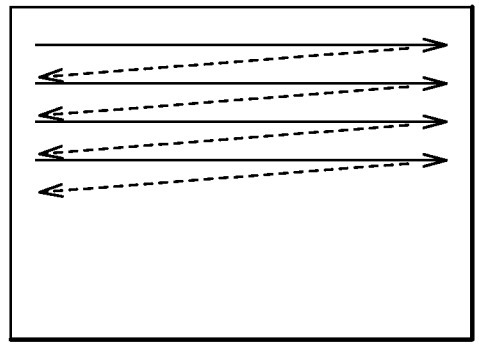
[FIG. 14B]
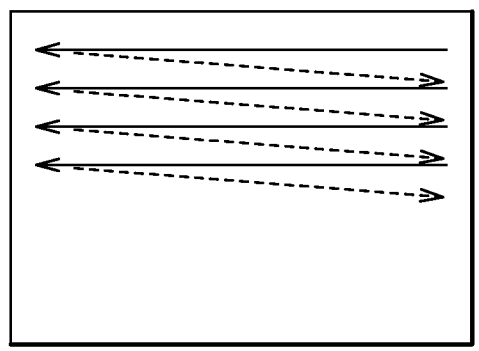
[FIG. 14C]
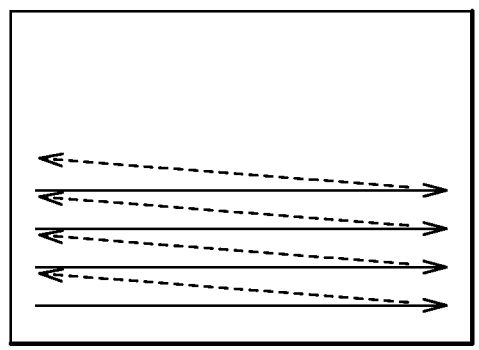
[FIG. 14D]
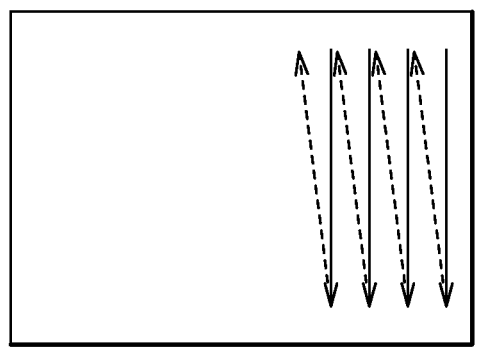

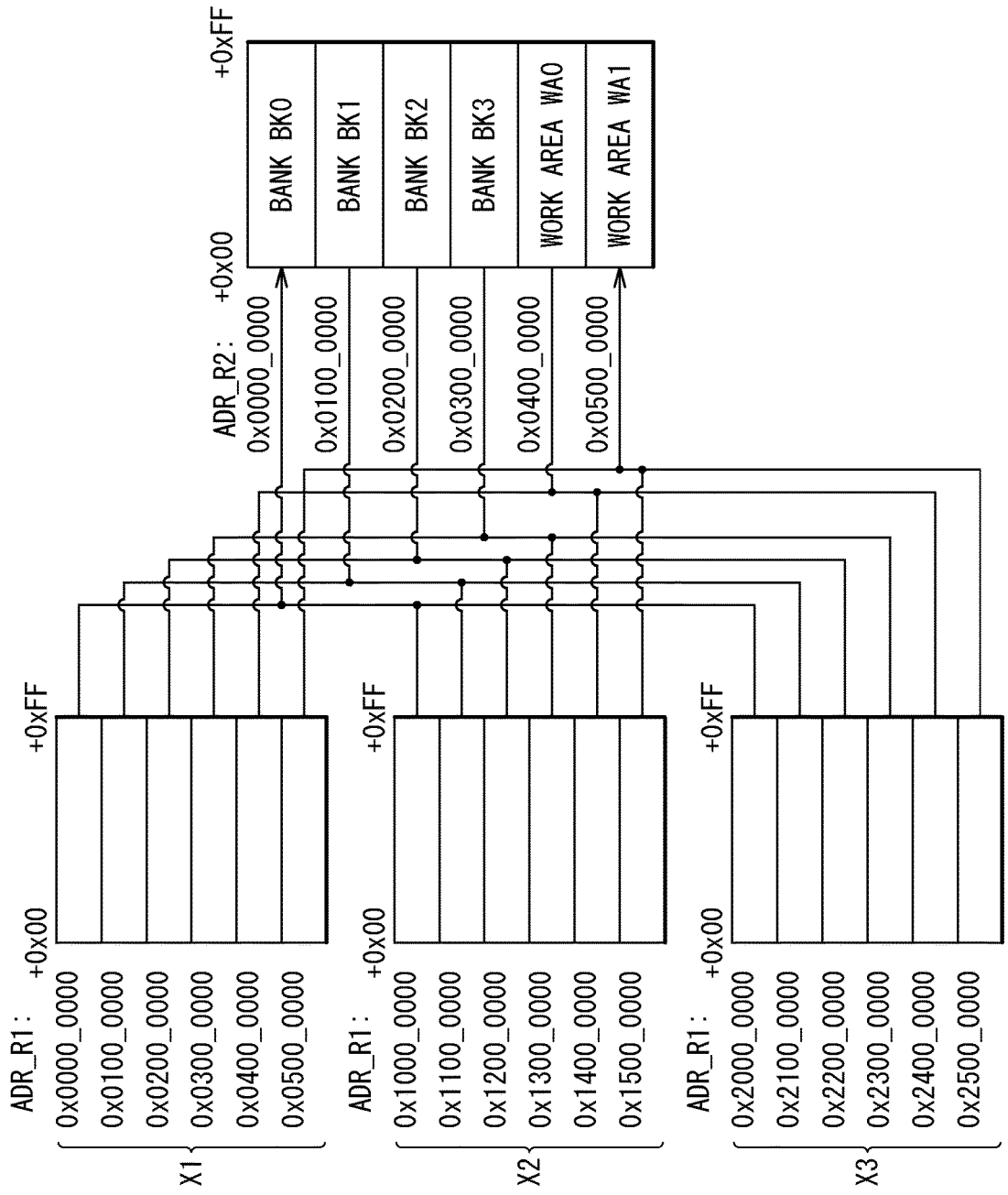
[FIG. 15]

[FIG. 16]
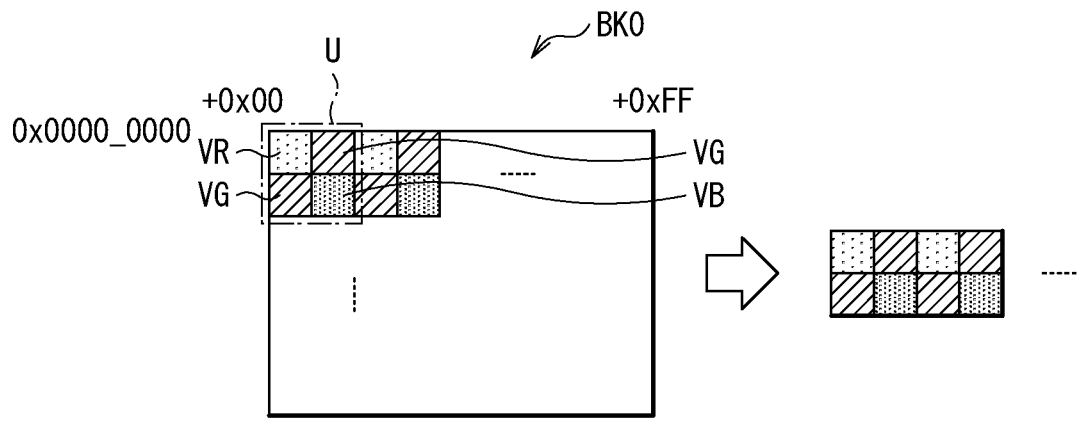
[FIG. 17]
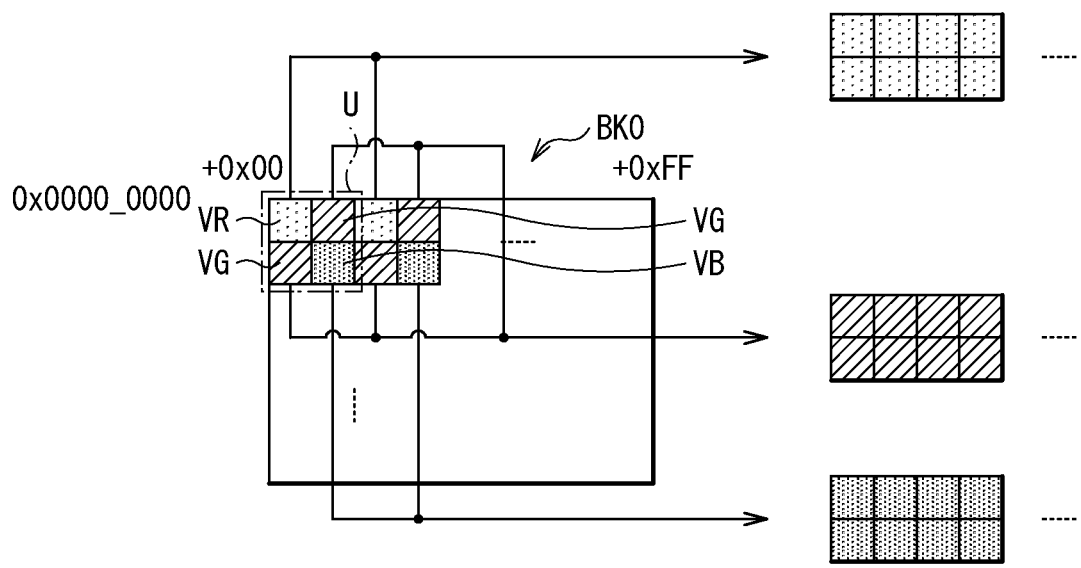
[FIG. 18]
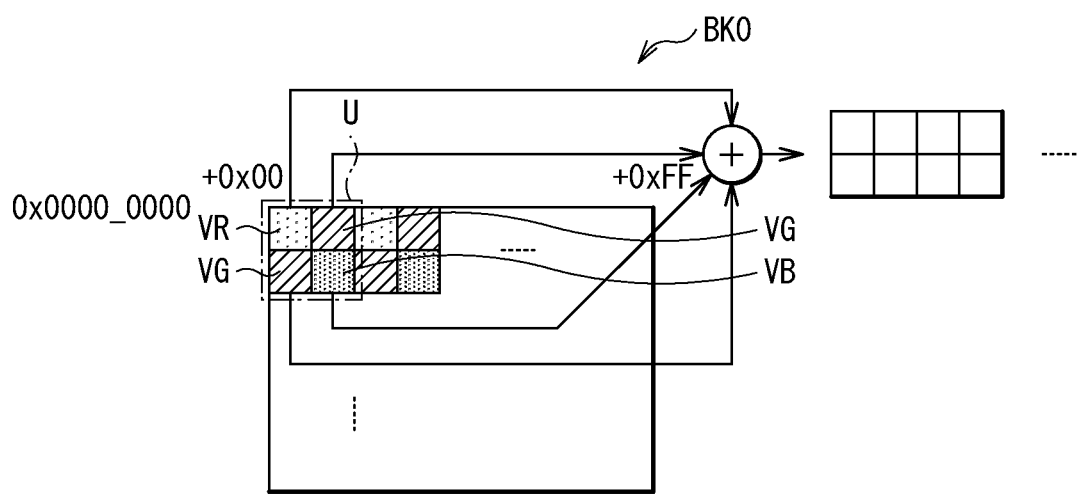

[FIG. 19]
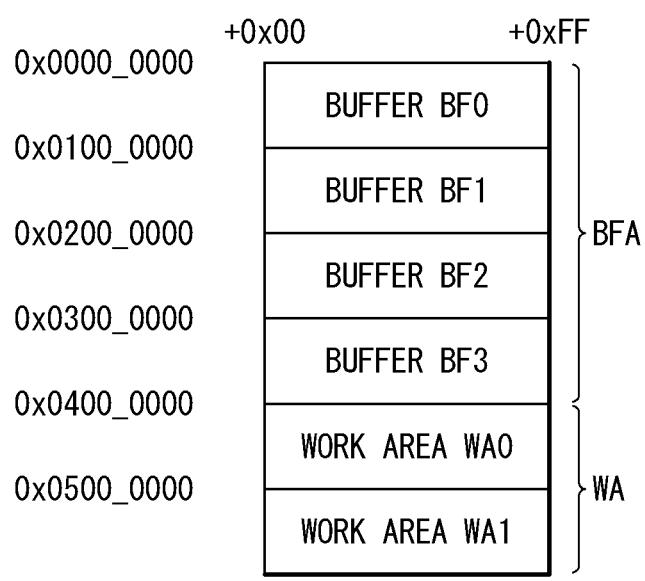

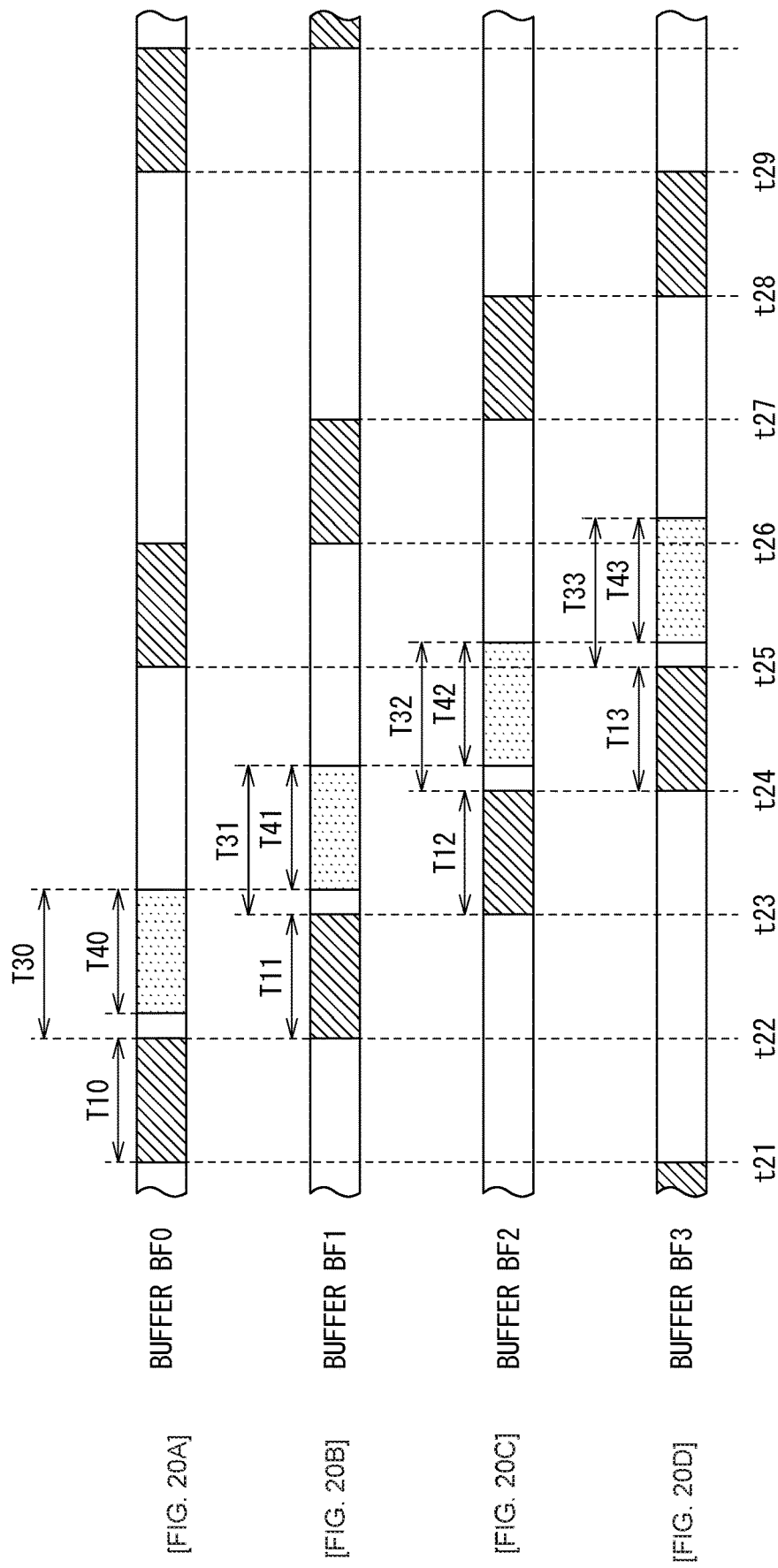

[FIG. 21]
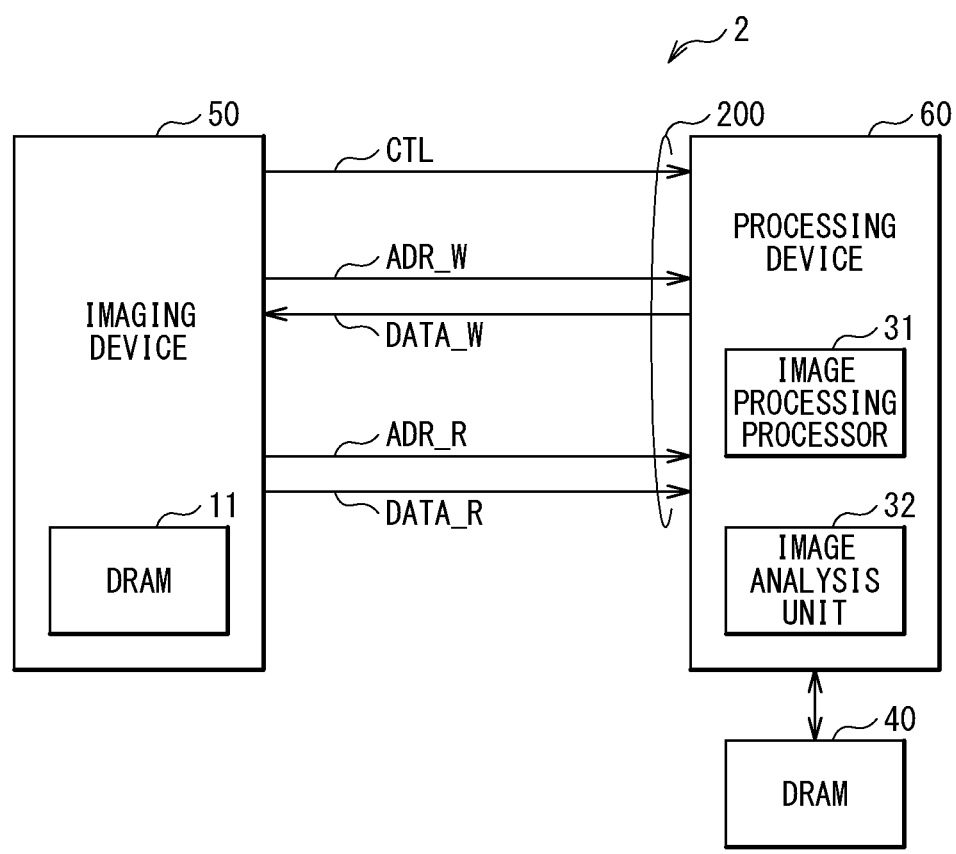

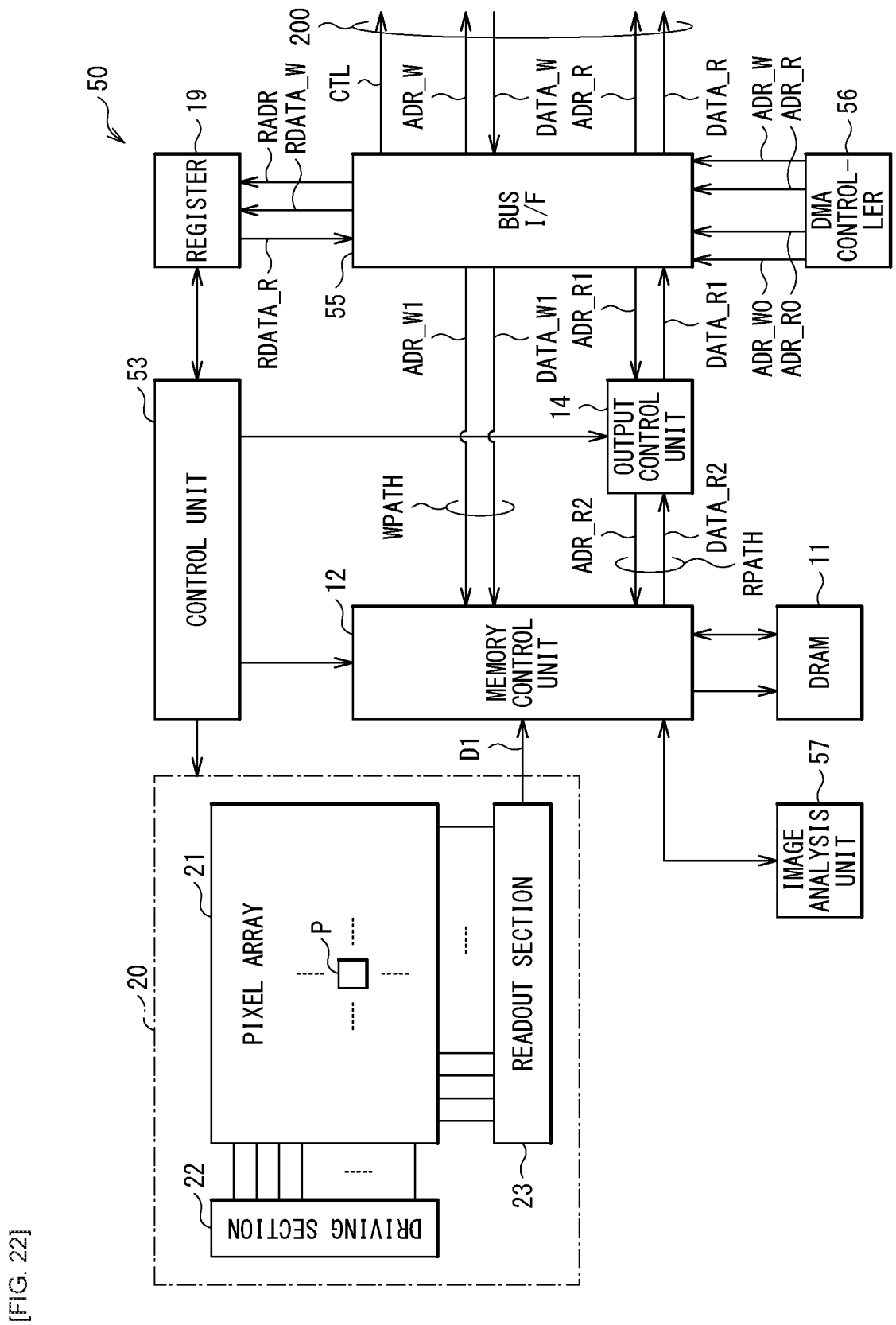
[FIG. 22]

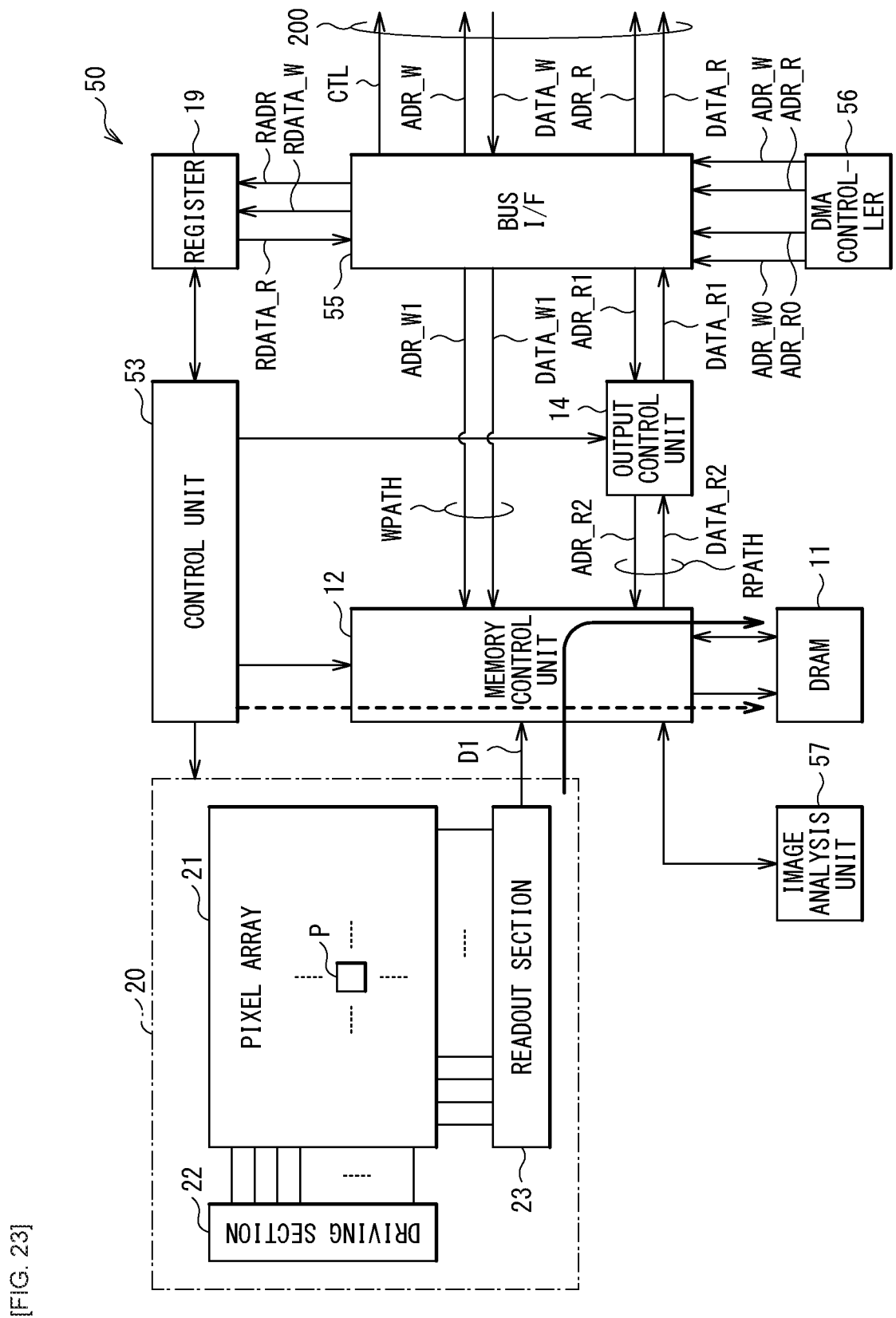
[FIG. 23]

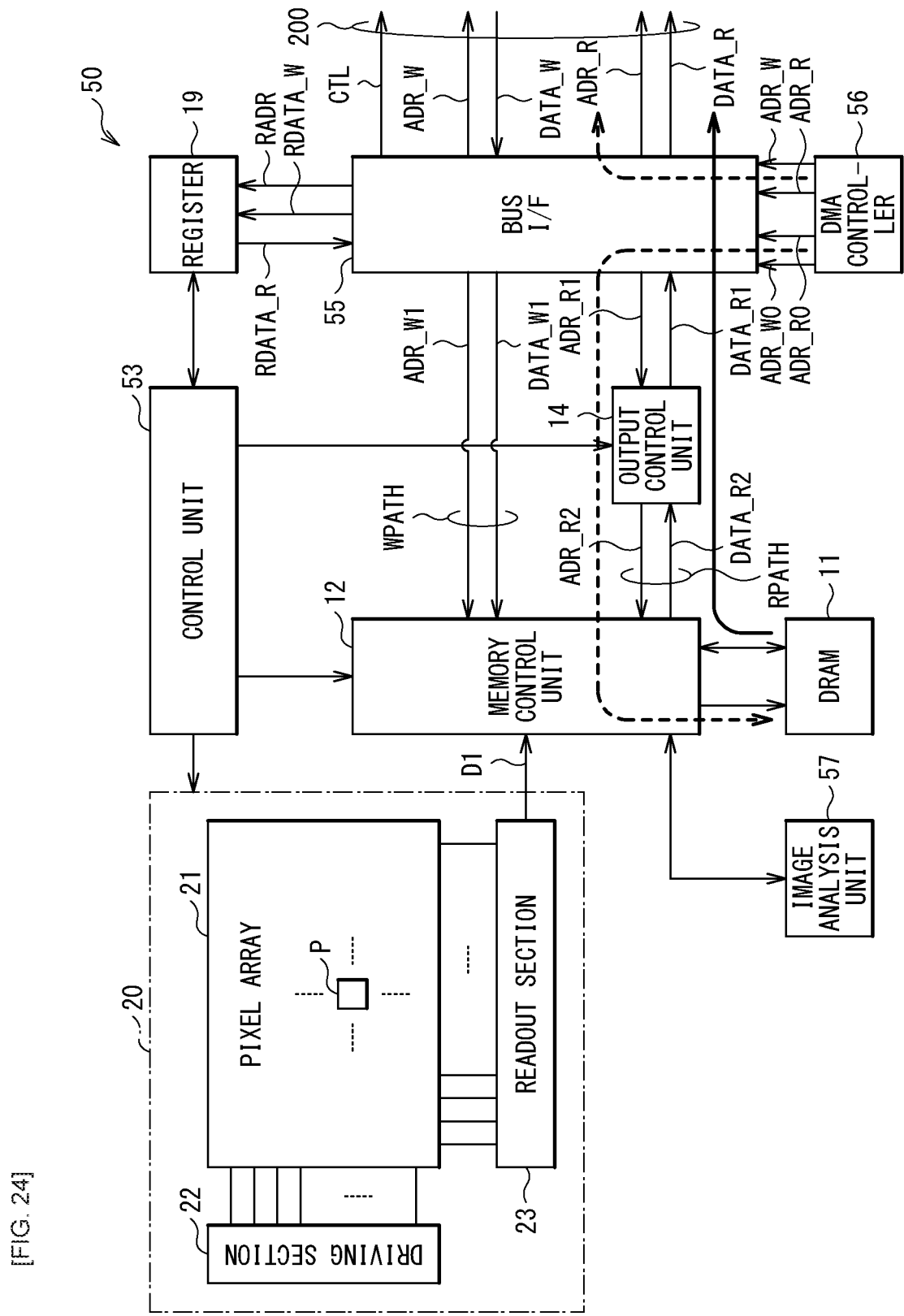

[FIG. 25]
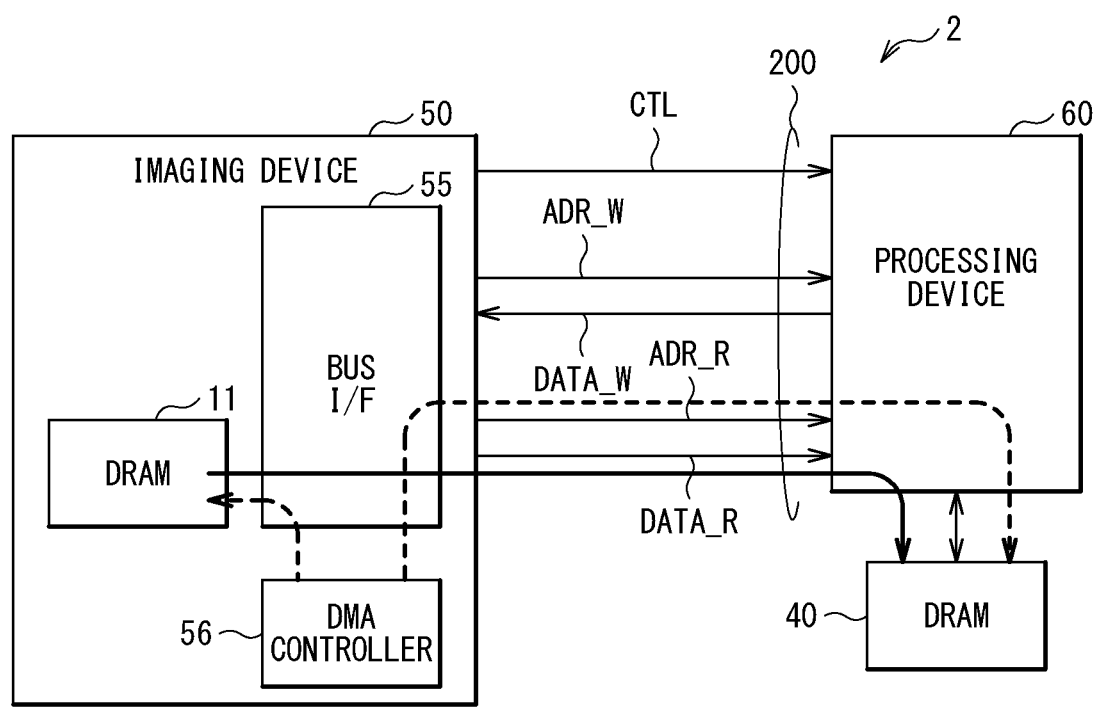

[FIG. 26A]
INTERNAL ADDRESS
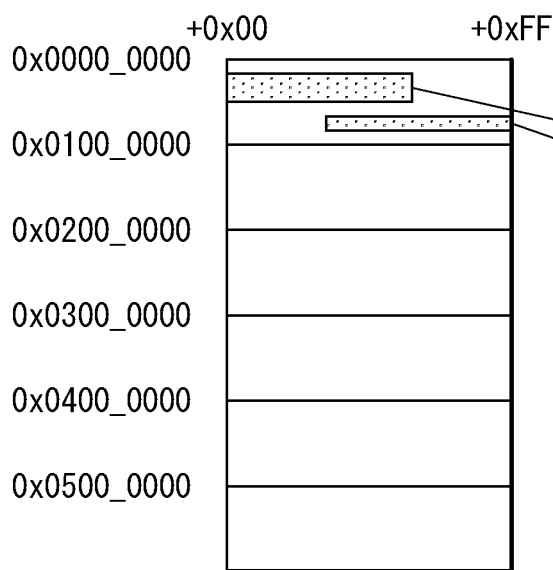
[FIG. 26B]
LOGICAL ADDRESS
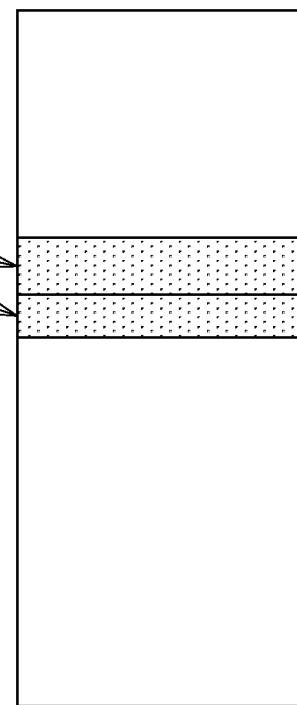

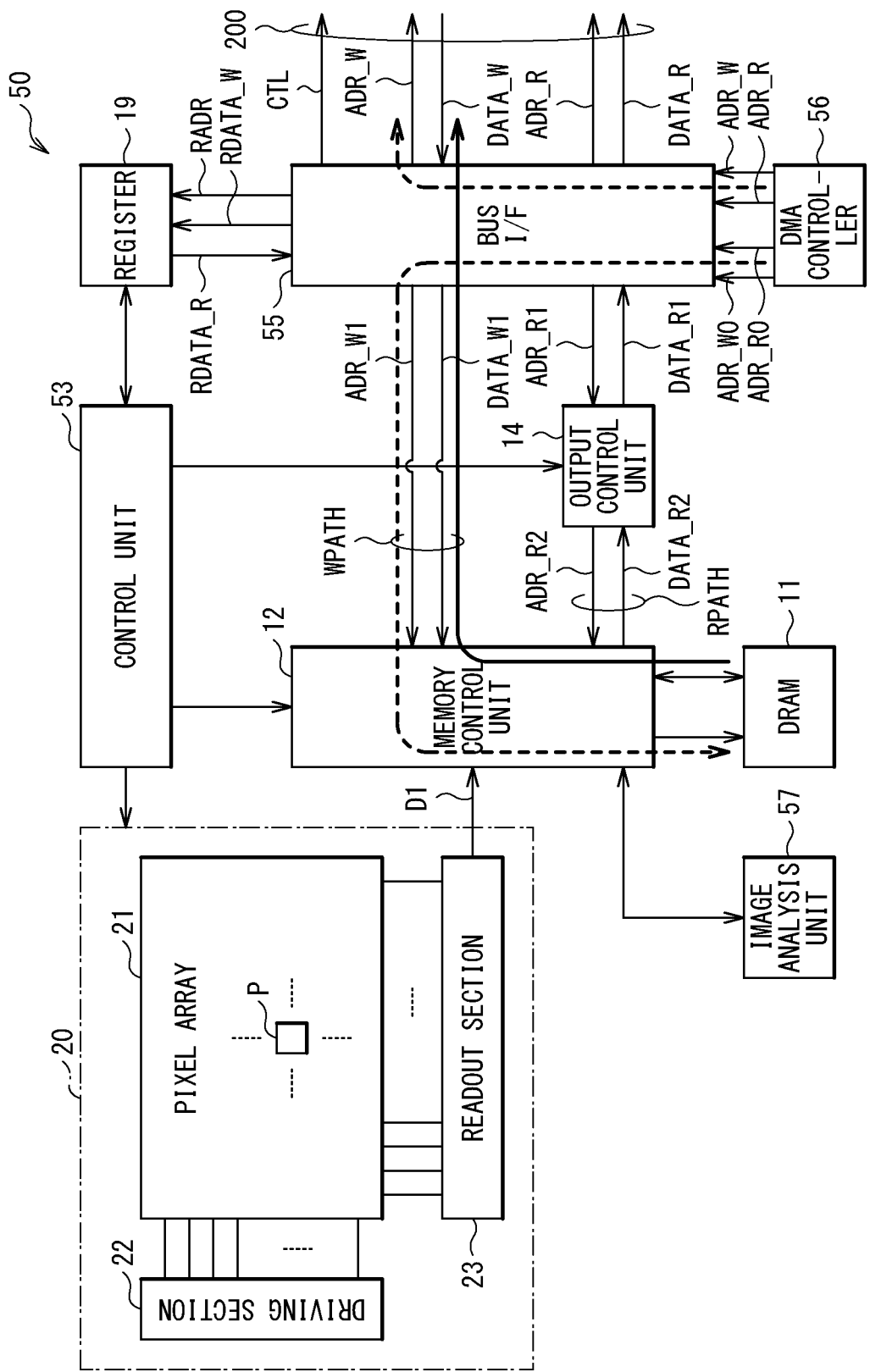
[FIG. 27]

[FIG. 28]
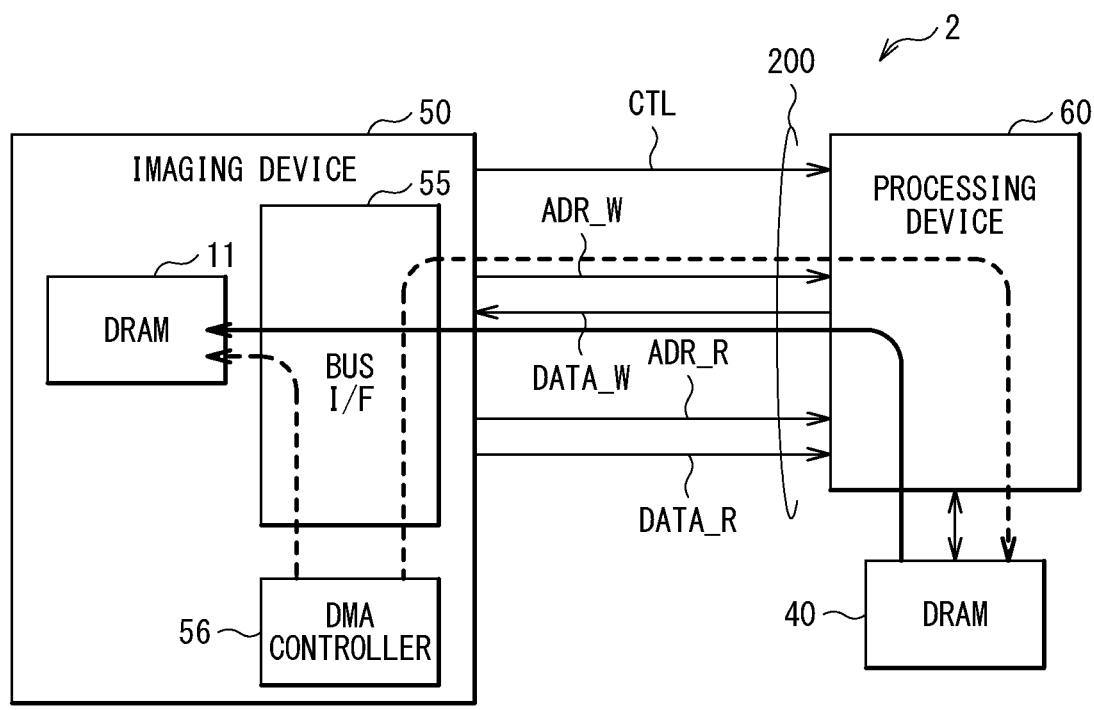

[FIG. 29A]
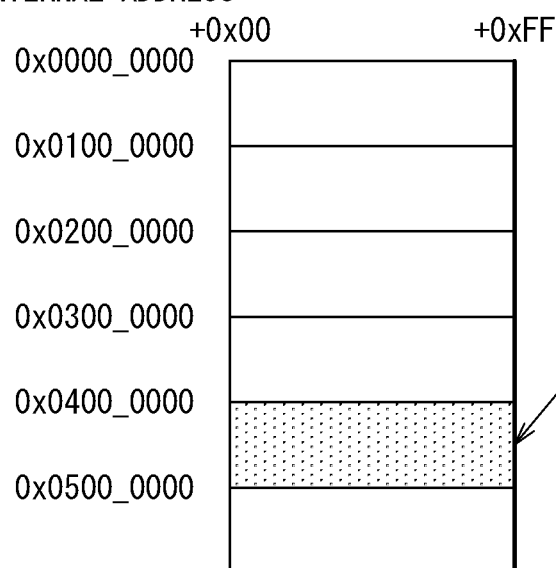
INTERNAL ADDRESS
FIG. 29B
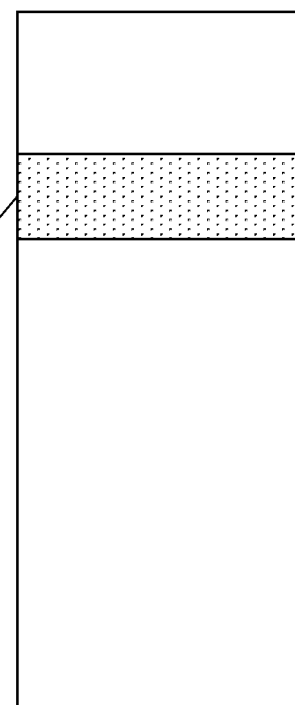
LOGICAL ADDRESS

[FIG. 30]
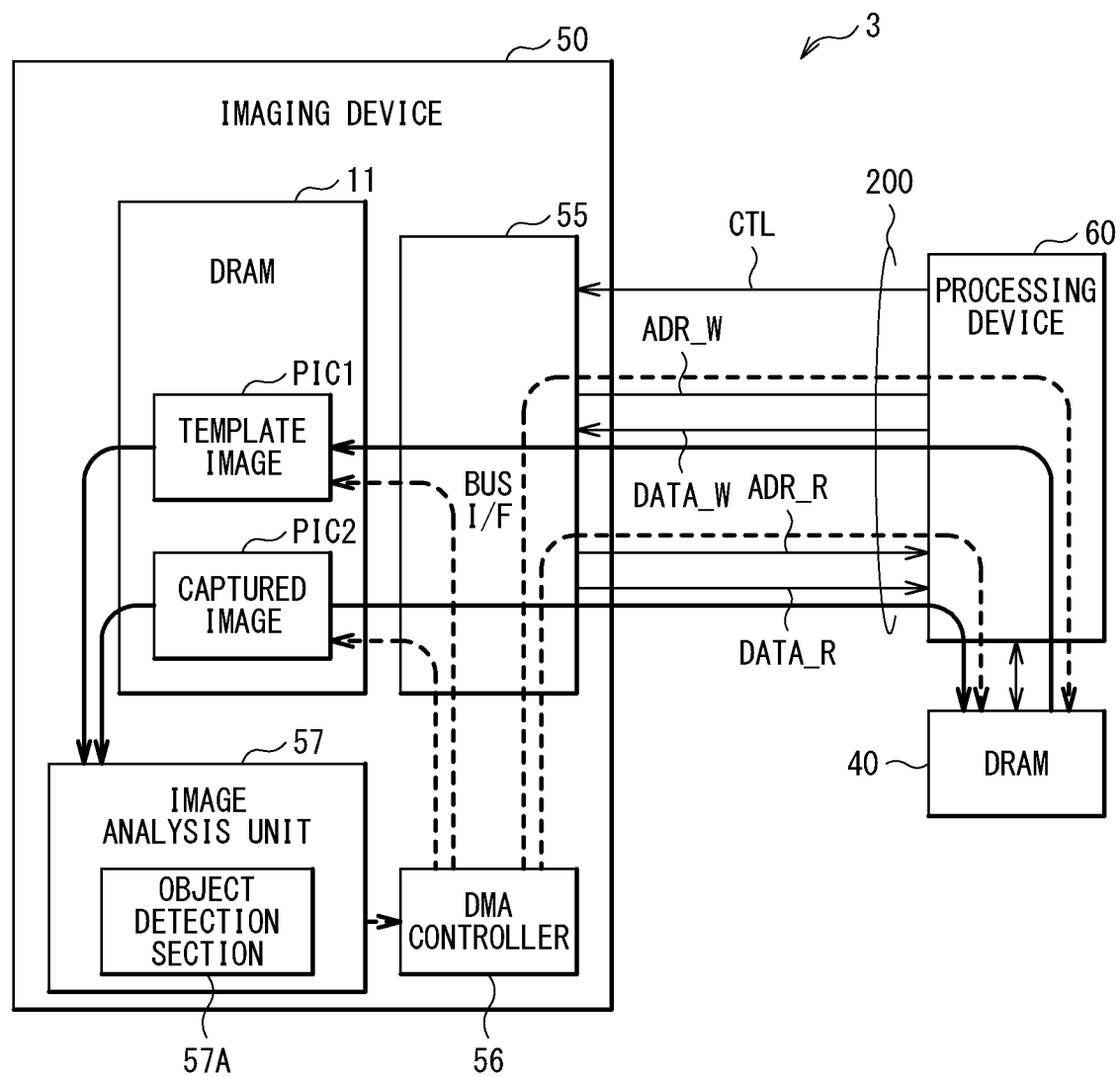

[FIG. 31]
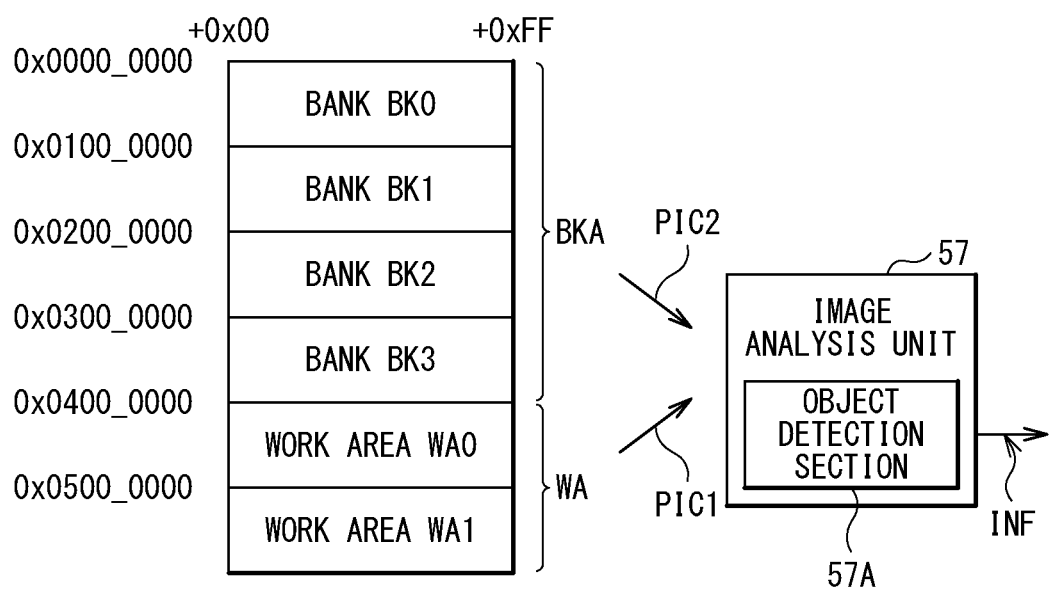

[FIG. 32]
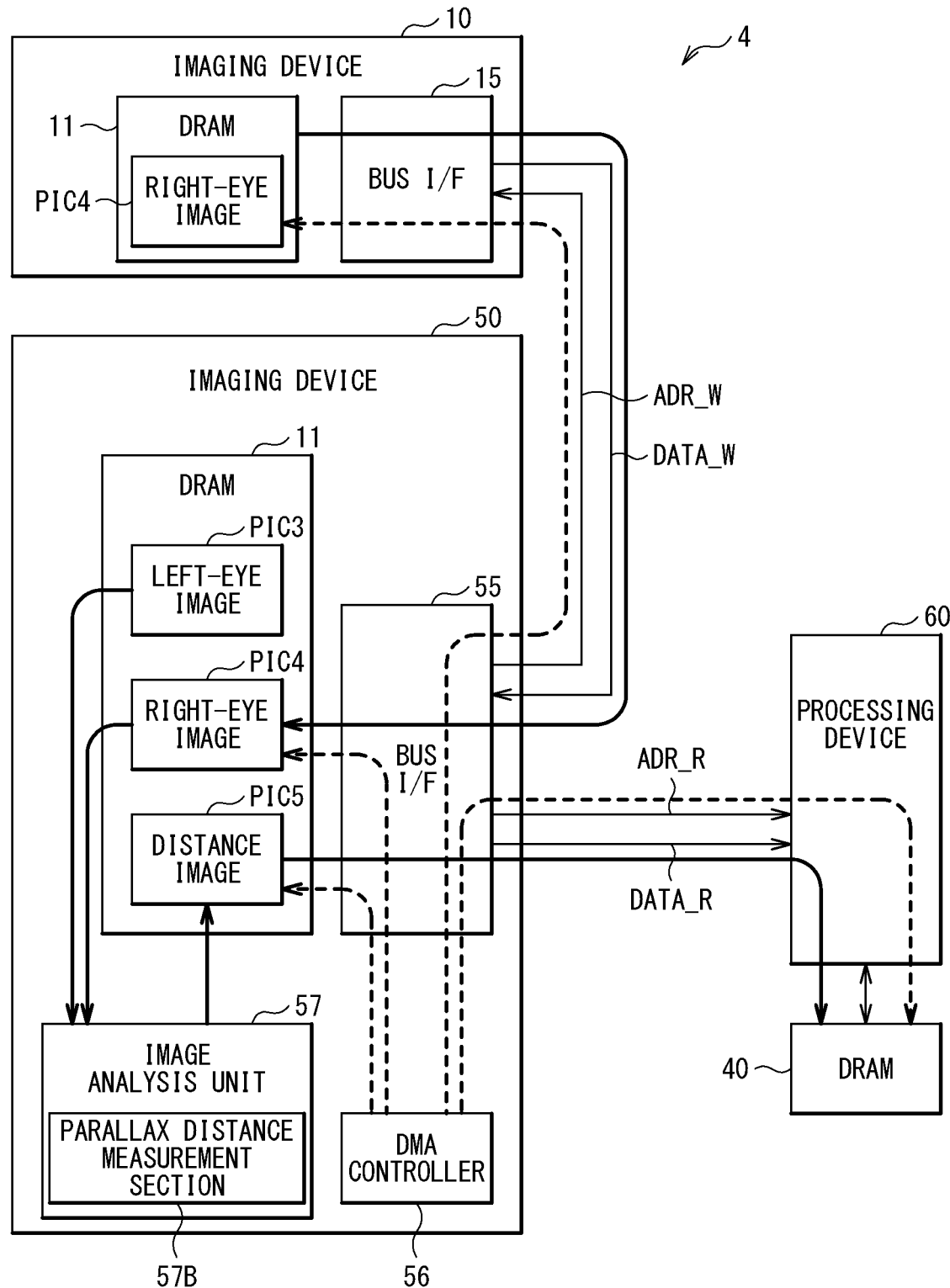

[FIG. 33]
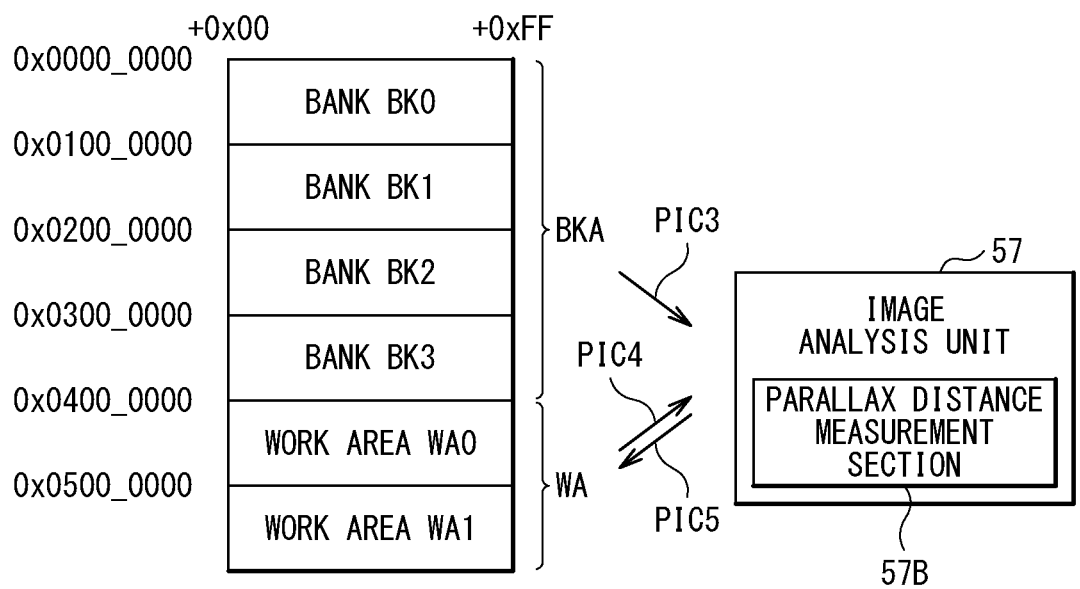

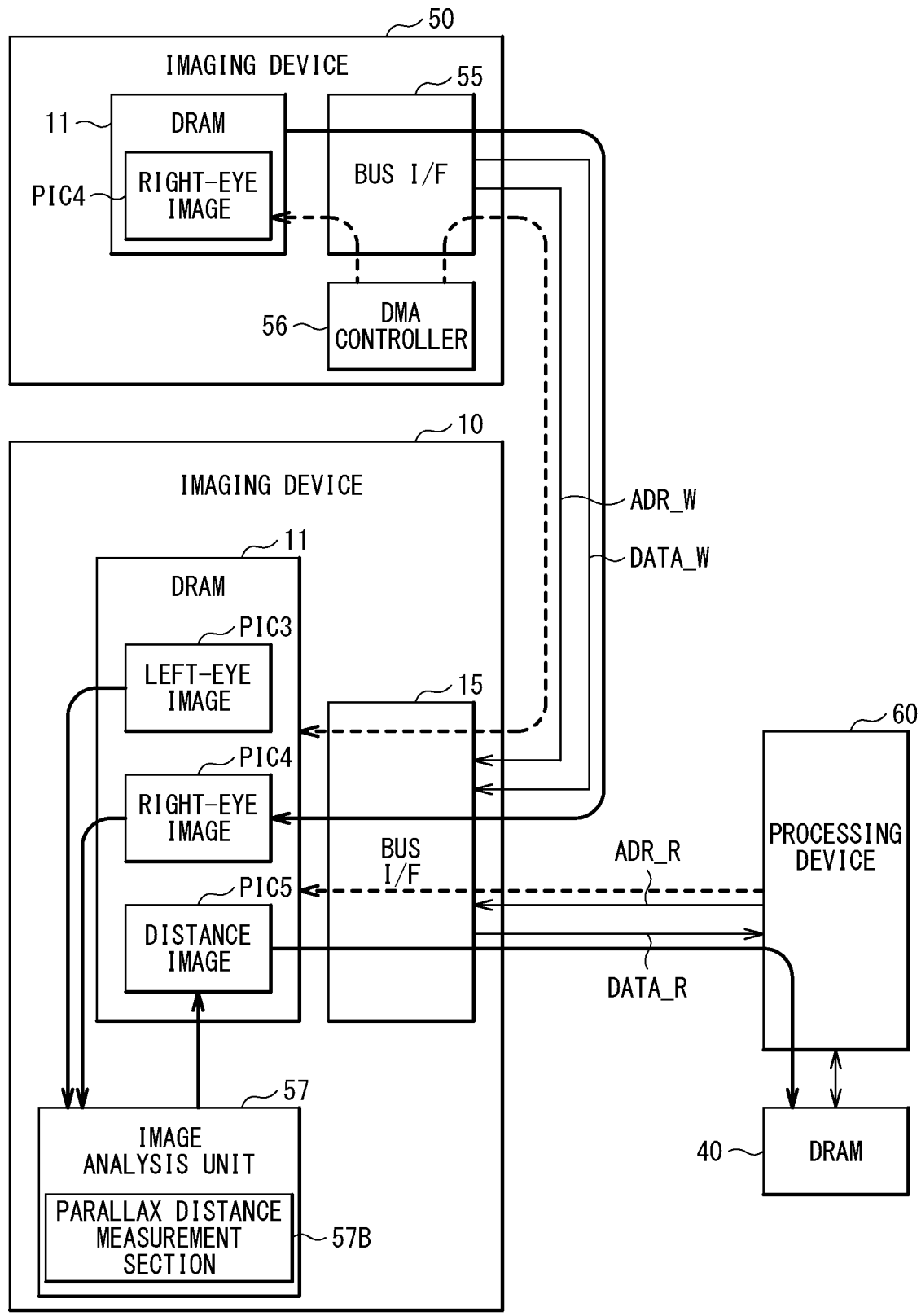
[FIG. 34]

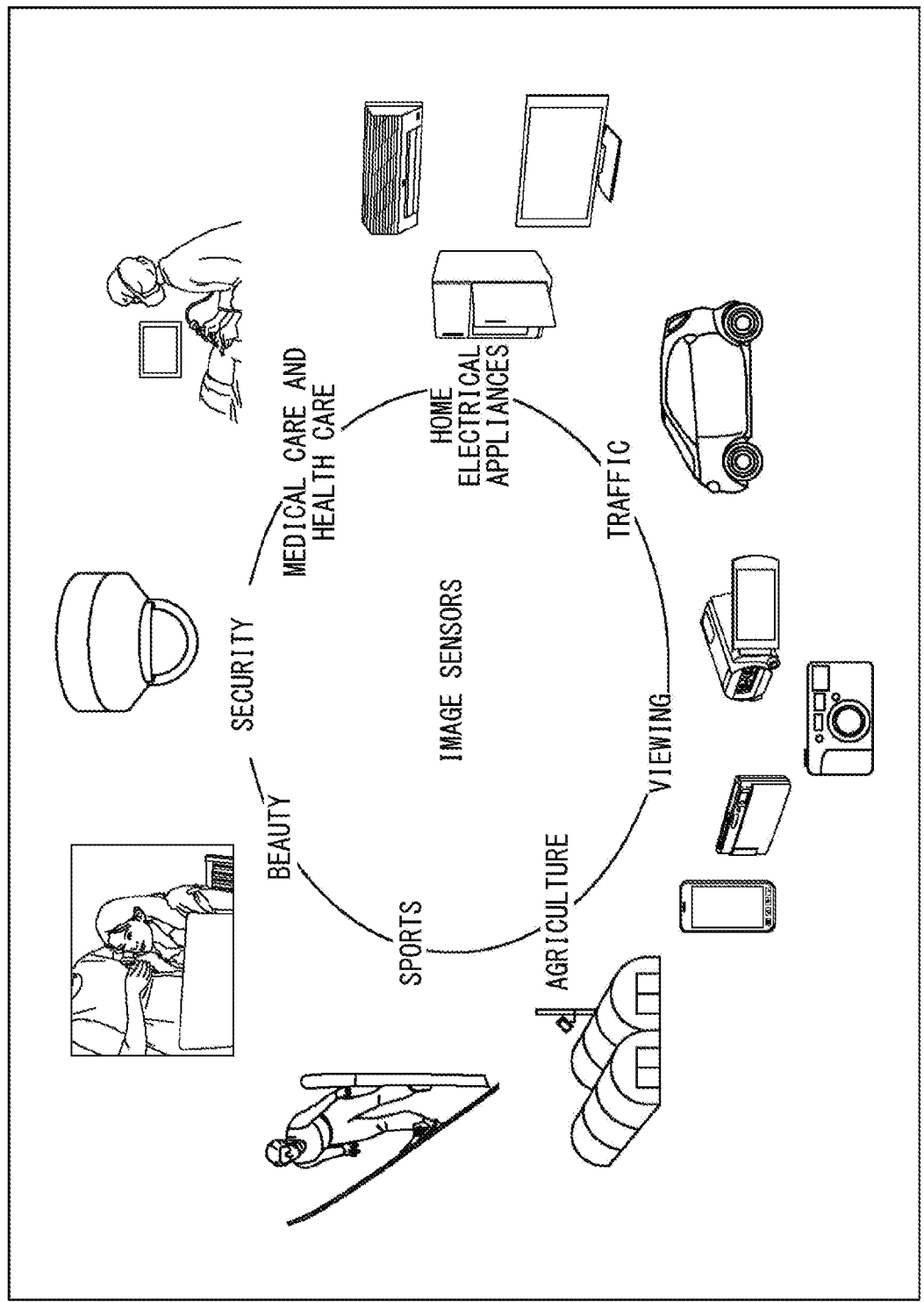
[FIG. 35]

[FIG. 37]
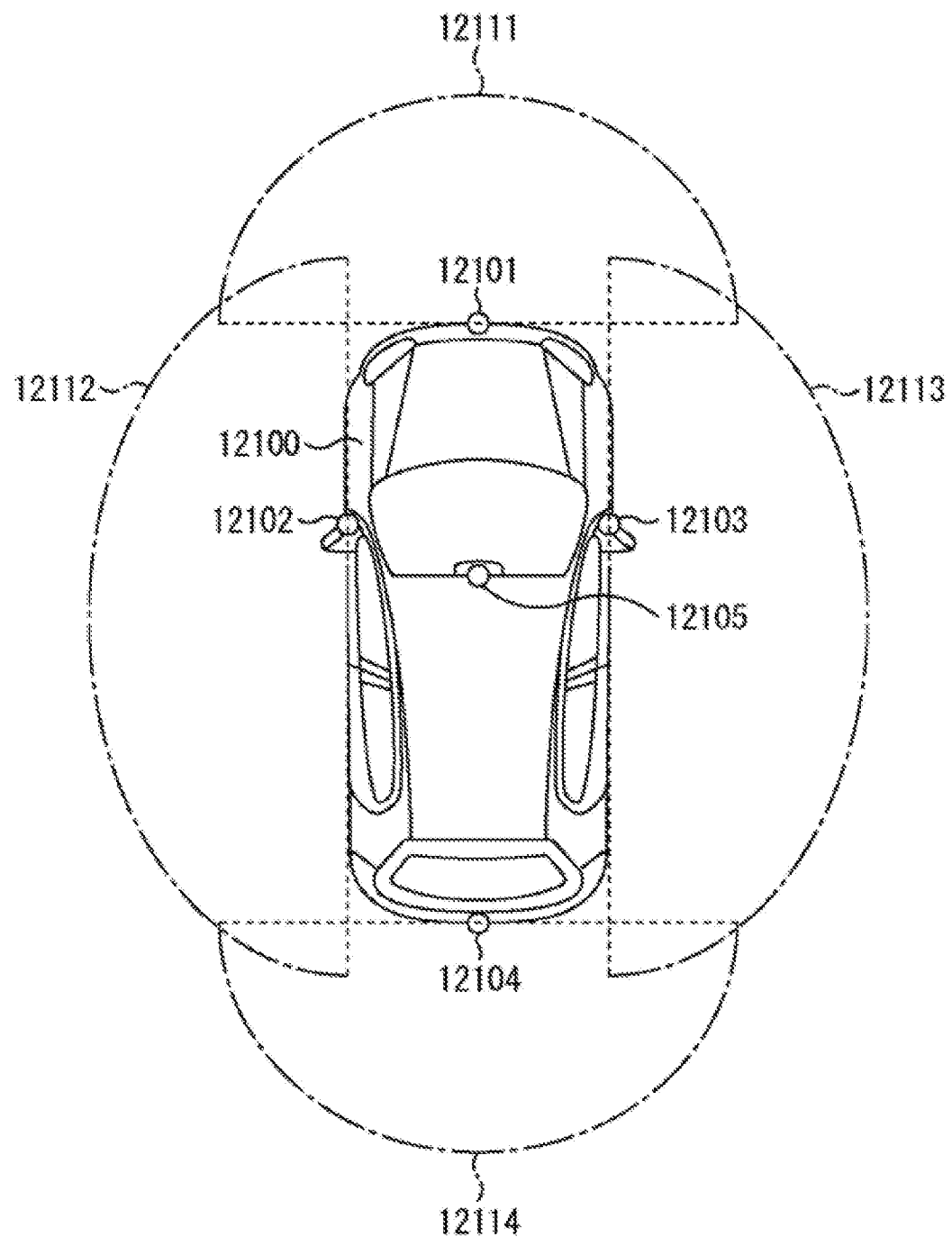

IMAGING DEVICE

CROSS REFERENCE TO RELATED APPLICATIONS

This application is a U.S. National Phase of International Patent Application No. PCT/JP2019/015456 filed on Apr. 9, 2019, which claims priority benefit of Japanese Patent Application No. JP 2018-083165 filed in the Japan Patent Office on Apr. 24, 2018. Each of the above-referenced applications is hereby incorporated herein by reference in its entirety.

TECHNICAL FIELD

The present disclosure relates to an imaging device that images a subject.

BACKGROUND ART

Some imaging devices are mounted with memories. For example, PTL 1 discloses an imaging device mounted with DRAM (Dynamic Random Access Memory).

CITATION LIST

Patent Literature

PTL 1: Japanese Unexamined Patent Application Publication No. 2016-187071

SUMMARY OF THE INVENTION

Incidentally, electronic apparatuses are each required to have a high degree of operation freedom. Imaging devices are also expected to each have a high degree of operation freedom.

It is desirable to provide an imaging device that allows the degree of operation freedom to be increased.

An imaging device according to an embodiment of the present disclosure includes a plurality of pixels; a memory unit; a memory control unit; and a bus interface. The plurality of pixels is formed in any of a plurality of semiconductor substrates that is stacked. The plurality of pixels is each configured to perform photoelectric conversion. The memory unit is formed in any of the plurality of semiconductor substrates. The memory unit is configured to store image data generated on the basis of a result of the photoelectric conversion. The memory control unit is formed in any of the plurality of semiconductor substrates. The memory control unit is configured to perform a read operation on the basis of first internal address information. The read operation is for reading, from memory unit, image data corresponding to the first internal address information among pieces of the image data. The bus interface is formed in any of the plurality of semiconductor substrates. The bus interface is configured to perform communication for first address information with an external device, supply the memory control unit with the first internal address information, and transmit the image data read by the memory control unit to the external device.

In the imaging device according to the embodiment of the present disclosure, the plurality of pixels performs photoelectric conversion. Image data generated on the basis of a result of the photoelectric conversion is stored in the memory unit. Communication for the first address information is performed between the external device and the bus interface. The first internal address information is supplied from the bus interface to the memory control unit. The memory control unit reads image data corresponding to the first internal address information from the memory unit on the basis of this first internal address information. The image data read by the memory control unit is then transmitted from the bus interface to the external device.

The imaging device according to the embodiment of the present disclosure causes the bus interface to perform communication for the first address information with the external device. This makes it possible to increase the degree of operation freedom. It is to be noted that the effects described here are not necessarily limited, but any of effects described in the present disclosure may be included.

BRIEF DESCRIPTION OF DRAWING

FIG. 1 is a block diagram illustrating a configuration example of an imaging system according to a first embodiment of the present disclosure.

FIG. 2 is a block diagram illustrating a configuration example of an imaging device illustrated in FIG. 1.

FIG. 3 is an explanatory diagram illustrating an example of pixels disposed in an imaging unit illustrated in FIG. 2.

FIG. 4 is an explanatory diagram illustrating an example of a memory map of DRAM illustrated in FIG. 2.

FIG. 5 is an explanatory diagram illustrating an example of image data stored in the DRAM illustrated in FIG. 2.

FIGS. 6A, 6B, 6C, and 6D is a are timing charts illustrating an operation example of the DRAM illustrated in FIG. 2.

FIG. 7 is an explanatory diagram illustrating an implementation example of the imaging device illustrated in FIG. 1.

FIG. 8 is another explanatory diagram illustrating an implementation example of the imaging device illustrated in FIG. 1.

FIG. 9 is an explanatory diagram illustrating an operation example of the imaging device illustrated in FIG. 2.

FIG. 10 is another explanatory diagram illustrating an operation example of the imaging device illustrated in FIG. 2.

FIG. 11 is another explanatory diagram illustrating an operation example of the imaging device illustrated in FIG. 2.

FIGS. 12A, 12B, 12C, 12D, 12E, 12F, 12G, and 12H are timing charts illustrating an example of an imaging operation by the imaging device illustrated in FIG. 2.

FIGS. 13A and 13B illustrate an example of data transmitted by the imaging device illustrated in FIG. 2.

FIG. 14A illustrates an example of a transmission operation of a pixel value by the imaging device illustrated in FIG. 2.

FIG. 14B illustrates another example of the transmission operation of a pixel value by the imaging device illustrated in FIG. 2.

FIG. 14C illustrates another example of the transmission operation of a pixel value by the imaging device illustrated in FIG. 2.

FIG. 14D illustrates another example of the transmission operation of a pixel value by the imaging device illustrated in FIG. 2.

FIG. 15 illustrates an example of an address switching process by an output control unit illustrated in FIG. 2.

FIG. 16 illustrates an example of a signal process by the output control unit illustrated in FIG. 2.

FIG. 17 illustrates another example of the signal process by the output control unit illustrated in FIG. 2.

FIG. 18 illustrates another example of the signal process by the output control unit illustrated in FIG. 2.

FIG. 19 is an explanatory diagram illustrating an example of a memory map of DRAM according to a modification example.

FIGS. 20A, 20B, 20C, and 20D is a are timing charts illustrating an operation example of the DRAM according to the modification example.

FIG. 21 is a block diagram illustrating a configuration example of an imaging system according to a second embodiment.

FIG. 22 is a block diagram illustrating a configuration example of the imaging device illustrated in FIG. 21.

FIG. 23 is an explanatory diagram illustrating an operation example of the imaging device illustrated in FIG. 22.

FIG. 24 is another explanatory diagram illustrating an operation example of the imaging device illustrated in FIG. 22.

FIG. 25 is an explanatory diagram illustrating an operation example of the imaging system illustrated in FIG. 21.

FIGS. 26A and 26B are another explanatory diagrams illustrating an operation example of the imaging system illustrated in FIG. 21.

FIG. 27 is another explanatory diagram illustrating an operation example of the imaging device illustrated in FIG. 22.

FIG. 28 is another explanatory diagram illustrating an operation example of the imaging system illustrated in FIG. 21.

FIGS. 29A and 29B are another explanatory diagrams illustrating an operation example of the imaging system illustrated in FIG. 21.

FIG. 30 is an explanatory diagram illustrating an operation example of the imaging system according to an application example.

FIG. 31 is an explanatory diagram illustrating an operation example of the imaging system illustrated in FIG. 30.

FIG. 32 is an explanatory diagram illustrating an operation example of an imaging system according to another application example.

FIG. 33 is an explanatory diagram illustrating an operation example of the imaging system illustrated in FIG. 32.

FIG. 34 is an explanatory diagram illustrating an operation example of an imaging system according to another application example.

FIG. 35 is an explanatory diagram illustrating a usage example of the imaging device.

FIG. 37 is a diagram of assistance in explaining an example of installation positions of an outside-vehicle information detecting section and an imaging section.

MODES FOR CARRYING OUT THE INVENTION

Figure 36:
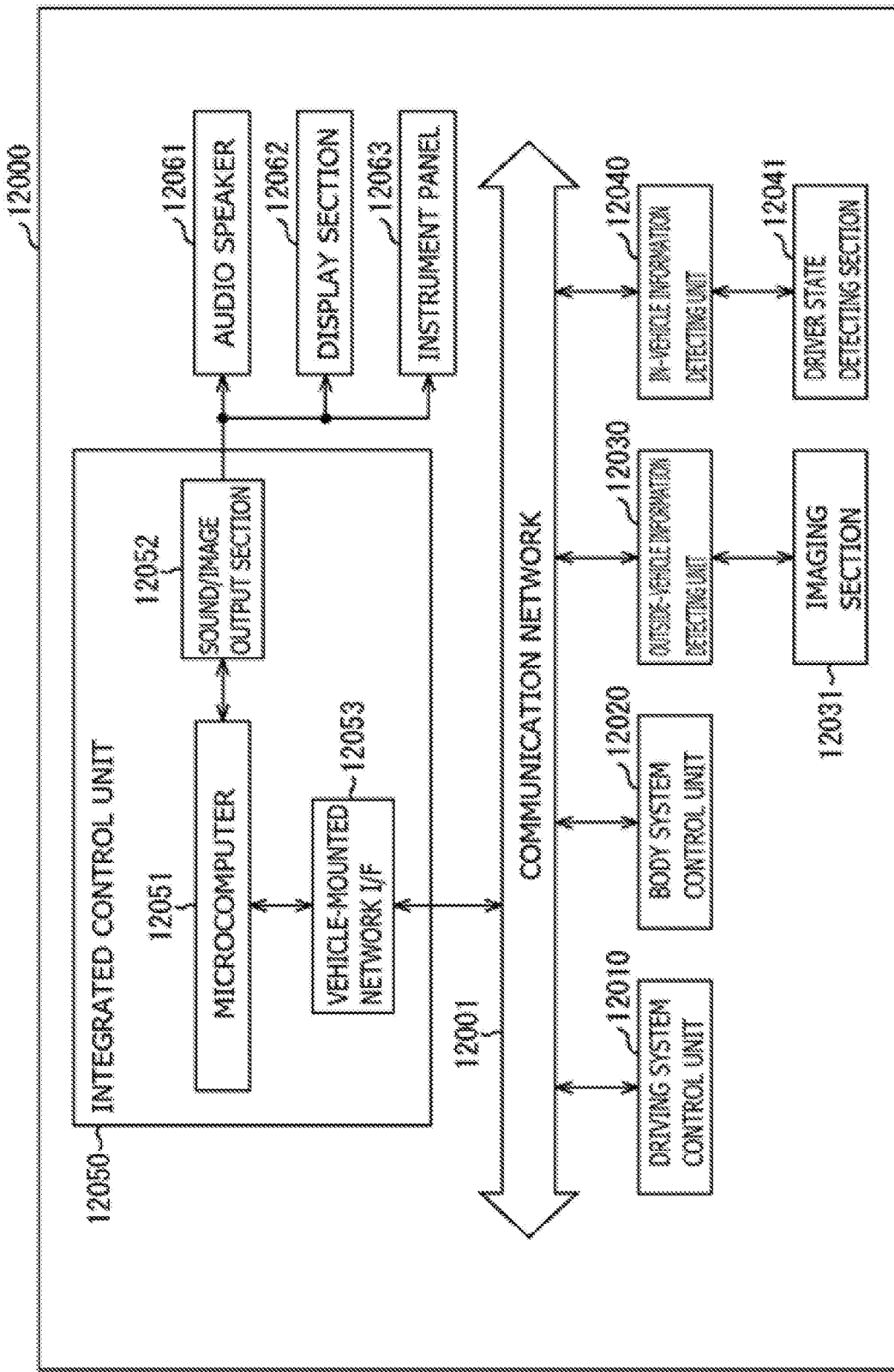
FIG. 36 is a block diagram depicting an example of schematic configuration of a vehicle control system.

The following describes embodiments of the present disclosure in detail with reference to the drawings. It is to be noted that description is given in the following order.
1. First Embodiment (Example of Imaging Device Operating as Slave)
2. Second Embodiment (Example of Imaging Device Operating as Master)
3. Application Examples
4. Usage Example of Imaging Device
5. Example of Application to Mobile Body

1. First Embodiment

Configuration Example

FIG. 1 illustrates a configuration example of an imaging system 1 including an imaging device (imaging device 10) according to a first embodiment. The imaging system 1 includes the imaging device 10, a processing device 30, and DRAM (Dynamic Random Access Memory) 40.

The imaging device 10 images a subject to generate image data. The imaging device 10 includes DRAM 11. For example, the DRAM 11 temporarily stores image data generated by the imaging device 10 as described below. This image data is read from the DRAM 11 and transmitted to the processing device 30 on the basis of a request from the processing device 30. In addition, this DRAM 11 is also configured to store data transmitted from the processing device 30.

The processing device 30 performs a variety of processes on the basis of image data generated by the imaging device 10. The processing device 30 includes, for example, an image processing processor (ISP: Image Signal Processor) 31 and an image analysis unit 32. The image processing processor 31 performs various kinds of image processing on the basis of image data. The image analysis unit 32 performs, for example, image analysis processes such as a motion detection process and a face detection process on the basis of image data.

The DRAM 40 temporarily stores data that is used for a variety of processes performed by the processing device 30.

The imaging device 10 and the processing device 30 are coupled to each other via a bus 100. The bus 100 transmits a read address ADR_R, read data DATA_R, a write address ADR_W, write data DATA_W, and control information CTL. The bus 100 may have any configuration as long as the configuration allows the read address ADR_R, the read data DATA_R, the write address ADR_W, the write data DATA_W, and the control information CTL to be transmitted. Specifically, for example, the bus 100 may be a serial bus or a parallel bus. In a case where a serial bus is used, there may be separately provided a bus that transmits the write address ADR_W and the write data DATA_W and a bus that transmits the read address ADR_R and the read data DATA_R. Alternatively, the read address ADR_R, the read data DATA_R, the write address ADR_W, and the write data DATA_W may be transmitted by using one bus. The address information (read address ADR_R and write address ADR_W), the data information (read data DATA_R and write data DATA_W), and the control information CTL may be transmitted by using packets. In addition, the bus 100 may be a so-called address/data multiplexed bus having both the address information and the data information in a time division manner. In addition, the bus 100 couples the imaging device 10 and the processing device 30 in a one-to-one manner in this example, but this is not limitative. For example, the bus 100 may couple a plurality of imaging devices including the imaging device 10 and a processing device in many-to-one manner. The bus 100 may couple the imaging device 10 and a plurality of processing devices including the processing device 30 in a many-to-one manner. In a case where a plurality of imaging devices including the imaging device 10 and a processing device are coupled in a many-to-one manner, it is desirable to use identification information or selection control information. The identification information is used to identify the plurality of imaging devices. The selection control information is used to select one of the plurality of imaging devices. In addition, the bus 100 may further transmit a clock signal. For example, in a case of a serial bus, PCIe (PCI Express) or USB (Universal Serial Bus) is usable for the bus 100. In a case of a parallel bus, PCI (Peripheral Component Interconnect) or VME (VERSA Module Eurocard) is usable. For example, in a case where the imaging system 1 is mounted on a vehicle, for example, LIN (Local Interconnect Network), CAN (Controller Area Network), or the like is usable for the bus 100. That is, an interface compliant with a predetermined standard is usable for the bus 100. In this example, the processing device 30 operates as a master and the imaging device 10 operates as a slave.

The read address ADR_R is a logical address for designating a memory region from which data is read in a case where data such as image data is read from the DRAM 11 of the imaging device 10. The read address ADR_R is an address in a memory map managed by the processing device 30 operating a master. In addition, in a case where data is read from a register 19 (described below) of the imaging device 10, the read address ADR_R also functions as an address for designating a register from which data is read. The processing device 30 transmits the read address ADR_R to the imaging device 10. The read data DATA_R is data read from the DRAM 11 or register 19 of the imaging device 10. The imaging device 10 transmits this read data DATA_R to the processing device 30.

The write address ADR_W is a logical address for designating a memory region in which data is written in a case where data is written in the DRAM 11 of the imaging device 10. The write address ADR_W is an address in a memory map managed by the processing device 30 operating a master. In addition, in a case where data is written in the register 19 (described below) of the imaging device 10, the write address ADR_W also functions as an address for designating a register in which data is written. The processing device 30 transmits the write address ADR_W to the imaging device 10. The write data DATA_W is data written in the DRAM 11 or register 19 of the imaging device 10. The processing device 30 transmits this write data DATA_W to the imaging device 10.

The control information CTL is information transmitted by the processing device 30 to the imaging device 10. The control information CTL includes, for example, identification information such as an identifier for identifying the imaging device 10 or the processing device 30, control information such as chip select (Chip Select), write enable (Write Enable), or read enable (Read Enable), and additional information such as the number of bytes of data written in the DRAM 11 of the imaging device 10 by using the one write address ADR_W or the number of bytes of data read from the DRAM 11 of the imaging device 10 by using the one read address ADR_R.

With this configuration, the imaging device 10 performs an imaging operation to generate image data and writes this image data in the DRAM 11 in the imaging system 1. The processing device 30 then transmits the read address ADR_R to the imaging device 10. The imaging device 10 reads image data from the memory region of the DRAM 11 corresponding to that read address ADR_R and transmits the read image data to the processing device 30 as the read data DATA_R. In addition, in the imaging system 1, the processing device 30 transmits the write address ADR_W and the write data DATA_W to the imaging device 10. The imaging device 10 writes the data indicated by that write data DATA_W in the memory region of the DRAM 11 corresponding to that write address ADR_W. In this way, the use of the bus 100 allows the imaging system 1 to bidirectionally transmit and receive data.

FIG. 2 illustrates a configuration example of the imaging device 10. The imaging device 10 includes a bus interface (bus I/F) 15, the register 19, an imaging unit 20, the DRAM 11, a memory control unit 12, a control unit 13, and an output control unit 14.

The bus interface (bus I/F) 15 is an interface for the bus 100 in the imaging device 10.

In a case where the read address ADR_R is an address for an instruction of access to the DRAM 11, the bus interface 15 converts a memory map on the basis of the read address ADR_R transmitted from the processing device 30, thereby generating a read address ADR_R1 that is an internal address (physical address) used in the imaging device 10. In addition, the bus interface 15 converts a data format on the basis of read data DATA_R1 supplied from the output control unit 14, thereby generating the read data DATA_R.

In addition, in a case where the write address ADR_W is an address for an instruction of access to the DRAM 11, the bus interface 15 converts a memory map on the basis of the write address ADR_W transmitted from the processing device 30, thereby generating a write address ADR_W1 that is an internal address (physical address) used in the imaging device 10. In addition, the bus interface 15 converts a data format on the basis of the write data DATA_W transmitted from the processing device 30, thereby generating write data DATA_W1.

In addition, in a case where the read address ADR_R is an address for an instruction of access to the register 19, the bus interface 15 converts a memory map on the basis of the read address ADR_R transmitted from the processing device 30, thereby generating a register address RADR. This causes the register 19 to read data on the basis of the register address RADR and supply the read data to the bus interface 15. In addition, the bus interface 15 converts a data format on the basis of register read data RDATA_R supplied from the register 19, thereby generating the read data DATA_R.

In addition, in a case where the write address ADR_W is an address for an instruction of access to the register 19, the bus interface 15 converts a memory map on the basis of the write address ADR_W transmitted from the processing device 30, thereby generating the register address RADR. In addition, the bus interface 15 converts a data format on the basis of the write data DATA_W transmitted from the processing device 30, thereby generating register write data RDATA_W. This causes the register 19 to store the data indicated by the register write data RDATA_W on the basis of the register address RADR.

In addition, the bus interface 15 has a function of supplying information included in the control information CTL transmitted from the processing device 30 to a variety of blocks in the imaging device 10.

The register 19 stores various kinds of setting information, various kinds of control information, various kinds of status information, and the like of the imaging device 10. The various kinds of control information include, for example, imaging control information such as a frame rate FR for the imaging operation of the imaging device 10. The various kinds of status information include, for example, information such as the operation state of the imaging operation and a bank BK (described below) for writing in the DRAM 11. On the basis of the register address RADR and register write data RDATA_W supplied from the bus interface (bus I/F) 15, the register 19 stores the data (e.g., various kinds of setting information, various kinds of control information, and the like) indicated by the register write data RDATA_W in the register designated by the register address RADR. The control unit 13 performs an operation on the basis of these various kinds of setting information and various kinds of control information stored in the register 19 and causes the register 19 to store the status information. In addition, on the basis of the register address RADR supplied from the bus interface 15, the register 19 reads data (e.g., various kinds of status information and the like) from the register designated by the register address RADR. The register 19 supplies the read data to the bus interface 15 as the register read data RDATA_R.

The imaging unit 20 performs an imaging operation on the basis of an instruction from the control unit 13, thereby imaging a subject. The imaging unit 20 includes a pixel array 21, a driving section 22, and a readout section 23.

The pixel array 21 includes a plurality of pixels P disposed in a matrix. Each of the pixels P includes, for example, a photodiode. The photodiode performs photoelectric conversion to generate electric charges on the basis of light and accumulates the electric charges. The plurality of pixels P in the pixel array 21 is driven by the driving section 22, for example, in units of pixel lines. Each pixel P then supplies the readout section 23 with the pixel voltage corresponding to the accumulated electric charges.

FIG. 3 illustrates a disposition example of the plurality of pixels P in the pixel array 21. The plurality of pixels P includes a red pixel PR, a green pixel PG, and a blue pixel PB. The red pixel PR performs photoelectric conversion on the basis of red light. The green pixel PG performs photoelectric conversion on the basis of green light. The blue pixel PB performs photoelectric conversion on the basis of blue light. In the pixel array 21, the four pixels P (unit U) disposed in two rows and two columns are repeatedly disposed. In the unit U, the red pixel PR is disposed on the upper left, the green pixels PG are disposed on the lower left and the upper right, and the blue pixel PB is disposed on the lower right. That is, in the pixel array 21, the red pixel PR, the green pixels PG, and the blue pixel PB are disposed in so-called Bayer arrangement.

The driving section 22 sequentially drives the plurality of pixels P in the pixel array 21 in units of pixel lines.

The readout section 23 performs AD conversion on the basis of the pixel voltage supplied from each pixel P of the pixel array 21, thereby generating image data D1. The readout section 23 then supplies this image data D1 to the memory control unit 12.

The DRAM 11 stores image data generated by the imaging device 10 and data transmitted from the processing device 30.

FIG. 4 illustrates an example of a memory map of the DRAM 11. In this example, the DRAM 11 is divided into a bank area BKA and a work area WA.

The bank area BKA includes four banks BK0 to BK3. Each of the four banks BK0 to BK3 stores image data for one frame that is generated by the imaging unit 20. That is, the bank area BKA stores pieces of image data for four frames.

FIG. 5 schematically illustrates image data stored in the bank BK0. The same applies to the banks BK1 to BK3. The image data includes pixel values VR, VG, and VB. The pixel value VR is a pixel value for red that is generated on the basis of a result of photoelectric conversion by the red pixel PR. The pixel value VG is a pixel value for green that is generated on the basis of a result of photoelectric conversion by the green pixel PG. The pixel value VB is a pixel value for blue that is generated on the basis of a result of photoelectric conversion by the blue pixel PB. Each of the banks BK0 to BK3 stores the three pixel values VR, VG, and VB in the order corresponding to the disposition of the red pixel PR, green pixel PG, and blue pixel PB in the pixel array 21. That is, this image data is so-called RAW data.

The work area WA stores data transmitted from the processing device 30. For example, the processing device 30 allows the DRAM 40 to temporarily store pieces of data used when various processes are performed. Similarly, the processing device 30 also allows the DRAM 11 of the imaging device 10 to temporarily store these pieces of data instead of the DRAM 40.

The memory control unit 12 performs a write operation for writing data in the DRAM 11 and a read operation for reading data from the DRAM 11. Specifically, the memory control unit 12 writes the image data D1 in the bank area BKA of the DRAM 11 on the basis of a write address supplied from the control unit 13 and the image data D1 supplied from the imaging unit 20. In addition, the memory control unit 12 reads data from the bank area BKA and work area WA of the DRAM 11 on the basis of a read address ADR_R2 supplied from the output control unit 14 and supplies the read data to the output control unit 14 as read data DATA_R2. In addition, the memory control unit 12 writes the write data DATA_W1 in the work area WA of the DRAM 11 on the basis of the write address ADR_W1 and write data DATA_W1 supplied from the bus interface (bus I/F) 15. That is, the supply path of the write address ADR_W1 and write data DATA_W1 between the memory control unit 12 and the bus interface 15 functions as a write path WPATH. The supply paths of the read addresses ADR_R1 and ADR_R2 and pieces of read data DATA_R1 and DATA_R2 between the memory control unit 12 and the bus interface 15 function as read paths RPATH.

The control unit 13 controls the operation of the imaging device 10. Specifically, the control unit 13 controls an imaging operation by the imaging unit 20 on the basis of the various kinds of setting information and various kinds of control information stored in the register 19. In addition, the control unit 13 also has functions of controlling a write operation and read operation of data by the memory control unit 12. The control unit 13 manages the banks BK0 to BK3 in the DRAM 11 when controlling the operation of the memory control unit 12. Specifically, when the image data D1 supplied from the imaging unit 20 is stored in the DRAM 11, the control unit 13 sequentially selects the bank BK in which image data for one frame included in the image data D1 is to be written among the banks BK0 to BK3 and generates the write address corresponding to that bank BK. In addition, the control unit 13 also has a function of supplying the output control unit 14 with pieces of information for the states of the banks BK0 to BK3.

FIGS. 6A, 6B, 6C, and 6D illustrate operation examples of the memory control unit 12 and control unit 13. FIGS. 6A, 6B, 6C, and 6D respectively illustrate write operations and read operations for the banks BK0 to BK3.

The control unit 13 sequentially selects the bank BK in which image data for one frame included in the image data D1 is to be written among the banks BK0 to BK3 and generates the write address. The memory control unit 12 then writes that image data for one frame in the selected bank BK on the basis of the write address generated by the control unit 13.

Specifically, the control unit 13 generates a write address for designating a memory region in the bank BK0 from timing t1 to timing t2 (write period T10). The memory control unit 12 writes the image data for one frame in the bank BK0 on the basis of this write address. The control unit 13 sets the bank BK0 in a readable state at the timing at which this writing is completed. Next, the control unit 13 generates a write address for designating a memory region in the bank BK1 from the timing t2 to timing t3 (write period T11). The memory control unit 12 writes the image data for the next one frame in the bank BK1 on the basis of this write address. The control unit 13 sets the bank BK1 in a readable state at the timing at which this writing is completed. Next, the control unit 13 generates a write address for designating a memory region in the bank BK2 from the timing t3 to timing t4 (write period T12). The memory control unit 12 writes the image data for the next one frame in the bank BK2 on the basis of this write address. The control unit 13 sets the bank BK2 in a readable state at the timing at which this writing is completed. Next, the control unit 13 generates a write address for designating a memory region in the bank BK3 from the timing t3 to timing t4 (write period T13). The memory control unit 12 writes the image data for the next one frame in the bank BK3 on the basis of this write address. The control unit 13 sets the bank BK3 in a readable state at the timing at which this writing is completed. The control unit 13 and the memory control unit 12 repeat these operations from the timing t1 to timing t5. In this way, the control unit 13 performs so-called ring buffer control to cyclically select the bank BK for writing.

The image data written in the bank BK0 from the timing t1 to the timing t2 (write period T10) is kept stored in the bank BK0 until the timing t5 at which the next write period for the bank BK0 is begun. This allows the memory control unit 12 to read the image data written from the timing t1 to the timing t2 (write period T10) from the bank BK0 from the timing t2 to the timing t5 (readable period T20) on the basis of the read address ADR_R2. Similarly, the memory control unit 12 is able to read the image data written from the timing t2 to the timing t3 (write period T11) from the bank BK1 from the timing t3 to timing t6 (readable period T21) on the basis of the read address ADR_R2. The memory control unit 12 is able to read the image data written from the timing t3 to the timing t4 (write period T12) from the bank BK2 from the timing t4 to timing t7 (readable period T22) on the basis of the read address ADR_R2. The memory control unit 12 is able to read the image data written from the timing t4 to the timing t5 (write period T13) from the bank BK3 from the timing t5 to timing t8 (readable period T23) on the basis of the read address ADR_R2.

For example, the memory control unit 12 is able to read the image data for one frame from the bank BK0 as it is in the readable period T20. Alternatively, the memory control unit 12 is able to read a portion of the image data for one frame. In addition, the memory control unit 12 is able to read the same image data a plurality of times from the bank BK0 in the readable period T20. In addition, the memory control unit 12 is able to read image data from the bank BK0 from the timing t4 to the timing t5 after reading image data from the bank BK1 from the timing t3 to the timing t4. In this way, the memory control unit 12 is able to relatively freely read pieces of image data from the banks BK0 to BK3.

The output control unit 14 generates the read address ADR_R2 on the basis of the read address ADR_R1 supplied from the bus interface (bus I/F) 15. The output control unit 14 then generates the read address ADR_R2 by using the pieces of information for the states of the banks BK0 to BK3 that are supplied from the control unit 13 in a case where the read address ADR_R1 is an address for designating a memory region in the bank area BKA in the DRAM 11. Specifically, for example, in a case where the read address ADR_R1 is an address for designating the image data of the frame one frame before the current frame, the output control unit 14 generates, as the read address ADR_R2, the address corresponding to the bank BK selected one bank before the currently selected bank BK for writing. In addition, in a case where the read address ADR_R1 is an address for designating the image data of the frame two frames before the current frame, the output control unit 14 generates, as the read address ADR_R2, the address corresponding to the bank BK selected two banks before the currently selected bank BK for writing. In addition, in a case where the read address ADR_R1 is an address for designating the image data of the frame three frames before the current frame, the output control unit 14 generates, as the read address ADR_R2, the address corresponding to the bank BK selected three banks before the currently selected bank BK for writing.

In addition, the output control unit 14 also has functions of generating the read address ADR_R2 by performing an address switching process as described below on the basis of the read address ADR_R1 and generating the read data DATA_R1 by performing a signal process corresponding to the address region (address region X1, X2, or X3 described below) to which the read address ADR_R1 belongs on the read data DATA_R2 supplied from the memory control unit 12. This signal process includes, for example, a process of changing the disposition of pixel values V in image data, a filter process, and the like as described below.

FIGS. 7 and 8 each illustrate an implementation example of the imaging device 10. In this example, three semiconductor substrates 111, 112, and 113 are formed in the imaging device 10. As illustrated in FIG. 7, the pixel array 21 is formed in the semiconductor substrate 111. The DRAM 11 is formed in the semiconductor substrate 112. A peripheral circuit 109 and the bus interface (bus I/F) 15 are formed in the semiconductor substrate 113. This peripheral circuit 109 corresponds to the driving section 22, the readout section 23, the memory control unit 12, the control unit 13, and the output control unit 14 in this example. As illustrated in FIG. 8, the semiconductor substrates 111, 112, and 113 are stacked and disposed in this order. The semiconductor substrates 111, 112, and 113 are then electrically coupled to each other, for example, via so-called TCVs (Through Chip Vias) and the like. It is to be noted that the semiconductor substrates 111, 112, and 113 are stacked in this order in this example, but this is not limitative. Instead of this, for example, the semiconductor substrates 111, 113, and 112 may be stacked in this order. In addition, in this example, the imaging device 10 is formed over three semiconductor substrates, but this is not limitative. Instead of this, for example, the imaging device 10 may be formed over two or less semiconductor substrates or four or more semiconductor substrates.

Here, the DRAM 11 corresponds to a specific example of a "memory unit" in the present disclosure. The memory control unit 12 corresponds to a specific example of a "memory control unit" in the present disclosure. The bus interface 15 corresponds to a specific example of a "bus interface" in the present disclosure. The output control unit 14 corresponds to a specific example of a "signal processing unit" in the present disclosure. The read address ADR_R corresponds to a specific example of "first address information" in the present disclosure. The read address ADR_R1 corresponds to a specific example of "first internal address information" in the present disclosure. The write address ADR_W corresponds to a specific example of "second address information" in the present disclosure. The write address ADR_W1 corresponds to a specific example of "second internal address information" in the present disclosure.

[Operations and Workings]

Next, the operations and workings of the imaging device 10 according to the present embodiment are described.

(Overview of Overall Operation)

First, an overview of the overall operation of the imaging system 1 is described with reference to FIG. 1. The imaging device 10 performs an imaging operation to generate image data and writes that image data in the bank area BKA of the DRAM 11. Then, in a case where the processing device 30 transmits the read address ADR_R for designating a memory region in the bank area BKA of the DRAM 11 to the imaging device 10, the imaging device 10 reads image data from the memory region corresponding to that read address ADR_R and transmits the read image data to the processing device 30 as the read data DATA_R.

In addition, in a case where the processing device 30 transmits the write address ADR_W and the write data DATA_W to the imaging device 10, the imaging device 10 writes the data indicated by that write data DATA_W in the memory region in the work area WA of the DRAM 11 corresponding to that write address ADR_W. Then, in a case where the processing device 30 transmits the read address ADR_R for designating a memory region in the work area WA of the DRAM 11 to the imaging device 10, the imaging device 10 reads data from the memory region corresponding to that read address ADR_R and transmits the read data to the processing device 30 as the read data DATA_R.

(Regarding Write Operation and Read Operation by Imaging Device 10)

Next, the operation of the imaging device 10 is described in detail. First, an operation for writing the image data D1 supplied from the imaging unit 20 in the bank area BKA of the DRAM 11, an operation for reading data from the bank area BKA of the DRAM 11 on the basis of the read address ADR_R transmitted from the processing device 30, an operation for writing data in the work area WA of the DRAM 11 on the basis of the write address ADR_W and write data DATA_W transmitted from the processing device 30, and an operation for reading data from the work area WA of the DRAM 11 on the basis of the read address ADR_R transmitted from the processing device 30 are described in detail.

FIG. 9 illustrates an example of the operation for writing the image data D1 supplied from the imaging unit 20 in the bank area BKA of the DRAM 11. The dashed arrow indicates the path of a write address and the solid arrow indicates the path of the image data D1.

The control unit 13 controls the imaging operation of the imaging unit 20. The imaging unit 20 performs an imaging operation on the basis of an instruction from the control unit 13, thereby generating the image data D1. The imaging unit 20 supplies the generated image data D1 to the memory control unit 12. In addition, the control unit 13 sequentially selects the bank BK in which image data for one frame included in the image data D1 is to be written among the banks BK0 to BK3. The control unit 13 then generates the write address corresponding to the selected bank BK and supplies that write address to the memory control unit 12. The memory control unit 12 writes image data for one frame in the selected bank BK in the DRAM 11 on the basis of the write address supplied from the control unit 13 and the image data D1 supplied from the imaging unit 20.

FIG. 10 illustrates an example of the operation for reading image data from the bank area BKA of the DRAM 11 on the basis of the read address ADR_R transmitted from the processing device 30. The dashed arrow indicates the path of a read address and the solid arrow indicates the path of image data read from the DRAM 11.

The bus interface (bus I/F) 15 converts a memory map on the basis of the read address ADR_R transmitted from the processing device 30, thereby generating the read address ADR_R1 that is an internal address (physical address) used in the imaging device 10. The output control unit 14 generates the read address ADR_R2 on the basis of the read address ADR_R1 supplied from the bus interface 15. The read address ADR_R1 is then an address for designating a memory region in the bank area BKA of the DRAM 11. The output control unit 14 thus generates a read address on the basis of the read address ADR_R1 by using the pieces of information for the states of the banks B_K0 to BK3 that are supplied from the control unit 13. In addition, the output control unit 14 further performs an address switching process to generate the read address ADR_R2 on the basis of this read address as described below. The memory control unit 12 reads image data from the DRAM 11 on the basis of this read address ADR_R2 and supplies the read image data to the output control unit 14 as the read data DATA_R2. The output control unit 14 generates the read data DATA_R1 by performing the signal process corresponding to the address region (address region X1, X2, or X3 described below) to which the read address ADR_R1 supplied from the bus interface 15 belongs on the read data DATA_R2 as described below. The bus interface 15 converts a data format on the basis of this read data DATA_R1, thereby generating the read data DATA_R. The bus interface 15 transmits this read data DATA_R to the processing device 30.

FIG. 11 illustrates an example of the operation for writing data in the work area WA of the DRAM 11 on the basis of the write address ADR_W and write data DATA_W transmitted from the processing device 30. The dashed arrow indicates the path of a write address and the solid arrow indicates the path of write data written in the DRAM 11.

The bus interface (bus I/F) 15 converts a memory map on the basis of the write address ADR_W transmitted from the processing device 30, thereby generating the write address ADR_W1 that is an internal address (physical address) used in the imaging device 10. In addition, the bus interface 15 converts a data format on the basis of the write data DATA_W transmitted from the processing device 30, thereby generating the write data DATA_W1. The memory control unit 12 then writes data in the work area WA of the DRAM 11 on the basis of these write address ADR_W1 and write data DATA_W1.

The operation for reading data from the work area WA of the DRAM 11 on the basis of the read address ADR_R transmitted from the processing device 30 is similar to the operation for reading image data from the bank area BKA of the DRAM 11 (FIG. 10). In this case, the output control unit 14 performs an address switching process described below on the basis of the read address ADR_R1 supplied from the bus interface 15, thereby generating the read address ADR_R2. That is, in this case, the read address ADR_R1 is not an address for designating a memory region in the bank area BKA of the DRAM 11. The output control unit 14 thus generates the read address ADR_R2 without using the pieces of information for the states of the banks BK0 to BK3 that are supplied from the control unit 13. In addition, the output control unit 14 generates the read data DATA_R1 by performing the signal process corresponding to the address region (address region X1, X2, or X3 described below) to which the read address ADR_R1 supplied from the bus interface 15 belongs on the read data DATA_R2 as described below.

(Regarding Imaging Operation)

Next, operations of writing image data in the DRAM 11 by the imaging device 10 performing an imaging operation, reading image data from the DRAM 11 on the basis of the read address ADR_R transmitted from the processing device 30, and transmitting the read image data to the processing device 30 as the read data DATA_R are described in detail.

FIGS. 12A, 12B, 12C, 12D, 12E, 12F, 12G, and 12H illustrate an operation example of the imaging device 10. FIG. 12A illustrates the waveform of a vertical synchronization signal XVS used by the imaging unit 20. FIG. 12B schematically illustrates an imaging operation by the imaging unit 20. FIG. 12C schematically illustrates a write operation for the DRAM 11. FIGS. 12D, 12E, 12F, and 12G illustrate operations for the banks BK0 to BK3 of the DRAM 11.

FIG. 12H schematically illustrates a transmission operation by the bus interface (bus I/F) 15. In FIG. 12B, for example, F(n) represents a n-th frame image F. In FIGS. 12B, 12C, and 12H, the vertical axes each correspond to the scanning direction in the pixel array 21.

The driving section 22 is driven to scan the plurality of pixels P in the pixel array 21 in units of pixel lines in accordance with the pulses of the vertical synchronization signal XVS (FIG. 12A) (FIG. 12B). Specifically, the driving section 22 performs accumulation driving DA to cause the photodiode of each pixel P to perform photoelectric conversion. Each pixel P accumulates electric charges generated through photoelectric conversion over a predetermined time. The driving section 22 then performs readout driving DB to cause each pixel P to supply the readout section 23 with the pixel voltage corresponding to the accumulated electric charges. The readout section 23 generates the image data D1 on the basis of the pixel voltage supplied from each pixel P of the pixel array 21.

The memory control unit 12 then writes the image data D1 in the bank area BKA of the DRAM 11 on the basis of a write address supplied from the control unit 13 and the image data D1 supplied from the imaging unit 20 (FIG. 12C). In this example, the memory control unit 12 writes the image data of the frame image F(n) in the bank BK0 in the write period T10 (FIG. 12D). The memory control unit 12 writes the image data of a frame image F(n+1) in the bank BK1 in the write period T11 (FIG. 12E). The memory control unit 12 writes the image data of a frame image F(n+2) in the bank BK2 in the write period T12 (FIG. 12F). The memory control unit 12 writes the image data of a frame image F(n+3) in the bank BK3 in the write period T13 (FIG. 12G).

In this example, the frame rate FR is changed from 60 fps to 30 fps at timing t15. Specifically, for example, the processing device 30 transmits the write address ADR_W for accessing the register 19 of the imaging device 10 and the write data DATA_W indicating control information to the imaging device 10. The control information indicates that the frame rate FR is set at 30 fps. The bus interface (bus I/F) 15 of the imaging device 10 generates the register address RADR on the basis of this write address ADR_W and generates the register write data RDATA_W on the basis of the write data DATA_W. The register 19 stores the control information for the frame rate FR on the basis of the register address RADR and the register write data RDATA_W. The control unit 13 changes the frame rate FR of the imaging device 10 on the basis of this control information for the frame rate FR stored in the register 19. At and after this timing t15, the memory control unit 12 writes the image data of the frame image F in the bank area BKA of the DRAM 11 every other frame image F. In this example, the memory control unit 12 writes the image data of a frame image F(n+4) in the bank BK0 in a write period T14 (FIG. 12D). The memory control unit 12 writes the image data of a frame image F(n+6) in the bank BK1 in a write period T15 (FIG. 12E). The memory control unit 12 writes the image data of a frame image F(n+8) in the bank BK2 in a write period T16 (FIG. 12F).

The bus interface (bus I/F) 15 generates the read address ADR_R1 on the basis of the read address ADR_R transmitted from the processing device 30. The output control unit 14 generates the read address ADR_R2 on the basis of this read address ADR_R1 by using the pieces of information for the states of the banks BK0 to BK3 that are supplied from the control unit 13. For example, in the period from timing t12 to timing t13, the output control unit 14 generates, as the read address ADR_R2, the address corresponding to the bank BK0 selected one bank before the currently selected bank BK1 for writing. The memory control unit 12 then reads the image data of the frame image F(n) from the DRAM 11 on the basis of this read address ADR_R2 and supplies the read image data to the output control unit 14 as the read data DATA_R2. The output control unit 14 performs a signal process on the read data DATA_R2 to generate the read data DATA_R1. The bus interface 15 converts a data format on the basis of this read data DATA_R1, thereby generating the read data DATA_R. The bus interface 15 transmits this read data DATA_R to the processing device 30 ((H) of FIG. 12H).

The processing device 30 sequentially transmits the read address ADR_R to the imaging device 10 a plurality of times to cause the imaging device 10 to transmit the image data of the one frame image F(n). That is, the memory region designated by the one read address ADR_R is smaller than a memory region in each bank BK. This causes the processing device 30 to sequentially transmit the read address ADR_R a plurality of times. Whenever receiving the read address ADR_R, the imaging device 10 thus reads image data from the DRAM 11 on the basis of this read address ADR_R and transmits the read image data to the processing device 30. In this way, the imaging device 10 is able to transmit the image data of the one frame image F(n).

In this example, from timing t14 to timing t16, the imaging device 10 stops a transmission operation for a short time when transmitting the image data of the frame image F(n+2). Specifically, the processing device 30 first stops transmitting the read address ADR_R to the imaging device 10. This prevents the imaging device 10 from receiving the read address ADR_R and the imaging device 10 performs no read operation on the image data from the DRAM 11. As a result, the imaging device 10 stops transmitting the read data DATA_R. Then, when the processing device 30 resumes transmitting the read address ADR_R, the imaging device 10 resumes transmitting the read data DATA_R.

In addition, in this example, when transmitting the image data of the frame image F(n+3), the imaging device 10 sets a high transfer rate from the timing t15 to the timing t16 to transmit the image data in a short time. Specifically, the processing device 30 sequentially transmits the plurality of read addresses ADR_R to the imaging device 10 at shorter time intervals than in the transmission operation from the timing t12 to the timing t13. This allows the imaging device 10 to set a high transfer rate for transmitting the read data DATA_R to the processing device 30.

FIG. 13A schematically illustrates the waveform of the read data DATA_R in a case where the plurality of read addresses ADR_R is sequentially transmitted at long time intervals. FIG. 13B schematically illustrates the waveform of the read data DATA_R in a case where the plurality of read addresses ADR_R is sequentially transmitted at short time intervals. Data W is data read from the memory region designated by the one read address ADR_R and transmitted. In a case where the processing device 30 sequentially transmits the plurality of read addresses ADR_R at long time intervals, the neighboring pieces of data W in the read data DATA_R have a wide interval as illustrated in FIG. 13A. This allows the imaging device 10 to transmit the read data DATA_R at a low transfer rate. In contrast, in a case where the processing device 30 sequentially transmits the plurality of read addresses ADR_R at short time intervals, the neighboring pieces of data W in the read data DATA_R have a narrow interval as illustrated in FIG. 13B. In this way, the read address ADR_R functions as not only information for designating a memory region for reading, but also as information for designating read timing. This allows the imaging device 10 to transmit the read data DATA_R at a high transfer rate.

In addition, in this example, when transmitting the image data of the frame image F(n+6), the imaging device 10 transmits the pieces of image data of a plurality of partial images included in the frame image F(n+6) at a variety of transfer rates in a variety of orders from timing t18 to timing t19 (FIGS. 12A, 12B, 12C, 12D, 12E, 12F, 12G, and 12H). Specifically, the imaging device 10 designates portions of the image data of the frame image F(n+6) to be read in a desirable order for reading by sequentially transmitting the plurality of read addresses ADR_R. This allows the imaging device 10 to transmit pieces of image data at a variety of transfer rates in a variety of orders on the basis of the plurality of read addresses ADR_R that is sequentially transmitted.

As described above, the imaging device 10 reads image data from the DRAM 11 on the basis of the read address ADR_R transmitted from the processing device 30 and transmits the read image data to the processing device 30 as the read data DATA_R. This increases, for example, processing loads on the processing device 30. In a case where the processing device 30 may fail to perform all the processes based on the read data DATA_R, adjusting timing for transmitting the read address ADR_R makes it possible to delay the start of the transmission of the read data DATA_R by the imaging device 10, stop the transmission of the read data DATA_R, or lower the transfer rate. In this way, it is possible to increase the degree of operation freedom in the imaging device 10. As a result, the processing device 30 is able to reduce the possibility that a portion of information transmitted from the imaging device 10 is missing. This makes it possible to perform all the processes based on the read data DATA_R.

That is, for example, in a case where an imaging device sequentially transmits image data to a processing device at a predetermined transfer rate, the processing device may fail to perform all the processes based on the read data DATA_R. In this case, a portion of information transmitted from the imaging device is missing. In contrast, the imaging device 10 transmits image data to the processing device 30 on the basis of the read address ADR_R transmitted from the processing device 30. This allows the imaging device 10 to adjust timing for transmitting the read data DATA_R to allow the processing device 30 to perform the processes. As a result, the processing device 30 is able to perform all the processes based on the read data DATA_R.

In addition, the imaging device 10 reads image data from the DRAM 11 on the basis of the read address ADR_R transmitted from the processing device 30. This makes it possible to dynamically set the position and size of an image region (ROI: Region of Interest) for a partial image of a frame image to be read. In addition, the imaging device 10 is able to read, for example, the pieces of image data of a plurality of partial images included in the frame image F from the DRAM 11. In addition, for example, even in a case where there are two partial images to be read and the image regions of these two partial images partially overlap with each other, the imaging device 10 is able to read the pieces of image data of the respective partial images from the DRAM 11. In this way, it is possible to increase the degree of freedom for setting an image region for a partial image to be read in the imaging device 10.

That is, for example, imaging devices each having a function of extracting a partial image have constraints such as limited settable image region size in many cases. It is not possible to freely set an image region. In addition, for example, in a case where an imaging device transmits a frame image to a subsequent processing device as it is and the processing device extracts a partial image from this frame image, the processing device has increased processing loads and a larger amount of data is transferred by the bus 100. In contrast, the imaging device 10 reads image data from the DRAM 11 on the basis of the read address ADR_R transmitted from the processing device 30. This makes it possible to increase the degree of freedom for setting an image region for a partial image to be read. This makes it possible to decrease, for example, processing loads on a processing device and suppress the amount of data transferred by the bus 100.

In addition, the imaging device 10 reads image data from the DRAM 11 on the basis of the read address ADR_R transmitted from the processing device 30 and transmits the read image data to the processing device 30. This allows the imaging device 10 to change the order for transmitting the pixel values V, for example, in a case where the image data of the frame image F is transmitted. Specifically, for example, as illustrated in FIG. 14A, it is possible to transmit the pixel values V in a so-called raster scan order. In addition, for example, as illustrated in FIG. 14B, it is possible to transmit the pixel values V in the order obtained by inverting the order illustrated in FIG. 14A with respect to the horizontal direction. In addition, for example, as illustrated in FIG. 14C, it is possible to transmit the pixel values V in the order obtained by inverting the order illustrated in FIG. 14A with respect to the vertical direction. In addition, for example, as illustrated in FIG. 14D, it is possible to transmit the pixel values V in the order obtained by rotating the order illustrated in FIG. 14A by 90 degrees. In this way, the imaging device 10 is able to increase the degree of freedom for transmitting image data.

In addition, the imaging device 10 allows the DRAM 11 to store data transmitted from the processing device 30. This allows the processing device 30 to use the DRAM 11 of the imaging device 10, for example, in a case where the DRAM 40 has a high memory use ratio or performs a process that requires a large amount of memory capacity. As a result, for example, the processing device 30 is able to suppress the memory capacity and perform a variety of processes that require a large amount of memory capacity.

(Regarding Address Switching Process and Signal Process)

Next, an address switching process and signal process by the output control unit 14 are described in detail.

FIG. 15 illustrates an example of an address switching process by the output control unit 14. The output control unit 14 performs an address switching process on the basis of the read address ADR_R1 supplied from the bus interface (bus I/F) 15, thereby generating the read address ADR_R2. The read addresses ADR_R1 are designated in the three address regions X1, X2, and X3 in this example. The address region X1 is a region starting from "0x0000_0000". The address region X2 is a region starting from "0x1000_0000". The address region X3 is a region starting from "0x2000_0000". As described below, the address region X2 is an address region used in a case where a process is performed of changing the disposition of the pixel values V in image data. The address region X3 is an address region used in a case where a filter process is performed. As illustrated in FIG. 15, the address regions X1, X2, and X3 are each associated with the memory map of the DRAM 11 illustrated in the right portion of FIG. 15.

In a case where the read address ADR_R1 belongs to the address region X1, the output control unit 14 sets the read address ADR_R2 as the same address as that read address ADR_R1.

In addition, in a case where the read address ADR_R1 belongs to the address region X2, the output control unit 14 sets the read address ADR_R2 as the address corresponding to that read address ADR_R1. Specifically, the output control unit 14 sets the read address ADR_R2 as "0x0000_0000", for example, in a case where the read address ADR_R1 is "0x1000_0000". The output control unit 14 sets the read address ADR_R2 as "0x0100_0000" in a case where the read address ADR_R1 is "0x1100_0000". The output control unit 14 sets the read address ADR_R2 as "0x0400_0000" in a case where the read address ADR_R1 is "0x1400 0000".

In addition, in a case where the read address ADR_R1 belongs to the address region X3, the output control unit 14 sets the read address ADR_R2 as the address corresponding to that read address ADR_R1. Specifically, the output control unit 14 sets the read address ADR_R2 as "0x0000_0000", for example, in a case where the read address ADR_R1 is "0x2000_0000". The output control unit 14 sets the read address ADR_R2 as "0x0100_0000" in a case where the read address ADR_R1 is "0x2100_0000". The output control unit 14 sets the read address ADR_R2 as "0x0400_0000" in a case where the read address ADR_R1 is "0x2400 0000".

In this way, the output control unit 14 performs an address switching process on the basis of the read address ADR_R1, thereby generating the read address ADR_R2. The memory control unit 12 reads data from the DRAM 11 on the basis of this read address ADR_R2 and supplies the read data to the output control unit 14 as the read data DATA_R2. The output control unit 14 then generates the read data DATA_R1 by performing the signal process corresponding to the address region X1, X2, or X3 to which the read address ADR_R1 supplied from the bus interface 15 belongs on the read data DATA_R2. The following describes a signal process by using, as an example, a case where the output control unit 14 performs a signal process on image data read from the bank BK0.

FIG. 16 schematically illustrates a signal process in a case where the read address ADR_R1 belongs to the address region X1. In a case where the read address ADR_R1 belongs to the address region X1, the output control unit 14 outputs the pixel values V stored in the bank BK0 as the read data DATA_R1 in the order as stored. As illustrated in FIG. 5, each of the banks BK0 to BK3 stores the three pixel values VR, VG, and VB in the order corresponding to the disposition of the red pixel PR, green pixel PG, and blue pixel PB in the pixel array 21. The output control unit 14 outputs image data including the three pixel values V as the read data DATA_R1 in this way. Such a data format is also referred to as interleave format.

FIG. 17 schematically illustrates a signal process in a case where the read address ADR_R1 belongs to the address region X2. In a case where the read address ADR_R1 belongs to the address region X2, the output control unit 14 collects only the pixel values VR for red among the pixel values V stored in the bank BK0 to generate image data for red, collects only the pixel values VG for green to generate image data for green, and collects only the pixel values VB for blue to generate image data for blue. The output control unit 14 then outputs these pieces of image data as the read data DATA_R1. Such a data format is also referred to as planar format.

FIG. 18 schematically illustrates a signal process in a case where the read address ADR_R1 belongs to the address region X3. In a case where the read address ADR_R1 belongs to the address region X3, the output control unit 14 generates image data by performing a filter process on the four pixel values V for the unit U that are stored in the bank BK0. Examples of the filter process may include a process of obtaining a luminance value, a process of obtaining a reduced image, an edge process, and the like. The output control unit 14 then outputs the pieces of image data generated through the filter process as the read data DATA_R1.

As described above, in the imaging device 10, the output control unit 14 generates the read address ADR_R2 by performing an address switching process on the basis of the read address ADR_R1 and performs the signal process corresponding to the address region X1, X2, or X3 to which that read address ADR_R1 belongs on the read data DATA_R2 supplied from the memory control unit 12. In this way, the read address ADR_R functions as not only information for designating a memory region for reading, but also as information for designating a signal process to be performed. This eliminates the necessity for the processing device 30 serving as a circuit subsequent to the imaging device 10 to perform these signal processes. It is thus possible to decrease processing loads on the processing device 30.

Especially an imaging device generally forms image data in the interleave format, but a processing device that performs image analysis generally performs image analysis by using image data in the planar format. Therefore, in a case where the imaging device transmits image data in the interleave format to the processing device, the processing device has to convert the image data in the interleave format to image data in the planar format, which may increase processing loads. In contrast, the imaging device 10 is able to generate image data in the planar format and transmit the image data to the processing device 30. This makes it possible to decrease processing loads on the processing device 30.

In addition, for example, in a case where the processing device 30 uses only one of image data for red, image data for green, and image data for blue to perform image analysis, the imaging device 10 only has to transmit the image data for that color alone to the processing device 30. This makes it possible to suppress the amount of data transferred by the bus 100. Especially, in a case where the imaging system 1 is mounted on a vehicle, image data for red alone may be transmitted to the processing device 30. This allows the processing device 30 to perform an analysis process of recognizing a red traffic light or a red stop sign while suppressing the amount of data by transferred the bus 100.

In this way, the imaging device 10 uses the read address ADR_R. This read address ADR_R then functions as information for designating a memory region for reading, information for designating read timing, and information for designating a signal process to be performed. For example, in a case where this read address ADR_R functions as information for designating a memory region for reading, the processing device 30 is able to designate the bank BK for reading, the position of an image region for a partial image to be read, the size of an image region, the number of image regions, a reading order, and the like by using the read address ADR_R. In a case where this read address ADR_R functions as information for designating read timing, the processing device 30 is able to designate a transfer rate, a transfer interval, transfer timing, and the like by using the read address ADR_R. In addition, in a case where this read address ADR_R functions as information for designating a signal process to be performed, it is possible to designate a data format such as the interleave format or the planar format, a filter process, and the like.

[Effects]

As described above, in the present embodiment, image data is read from DRAM of an imaging device on the basis of a read address transmitted from a processing device and the read image data is transmitted to the processing device. This makes it possible to increase the degree of operation freedom. As a result, the processing device is able to reduce the possibility that a portion of information transmitted from the imaging device is missing. This makes it possible to perform all the processes.

In the present embodiment, image data is read from DRAM of an imaging device on the basis of a read address transmitted from a processing device. This makes it possible to dynamically set the position and size of an image region (ROI: Region of Interest) for a partial image of a frame image to be read. As a result, it is possible to increase the degree of freedom for setting an image region for a partial image to be read.

In the present embodiment, image data is read from DRAM of an imaging device on the basis of a read address transmitted from a processing device and the read image data is transmitted to the processing device. This makes it possible to increase the degree of freedom for transmitting image data.

In the present embodiment, it is possible to cause DRAM of an imaging device to store data transmitted from a processing device. This allows the processing device to perform a variety of processes, for example, that require a large amount of memory capacity.

In the present embodiment, an output control unit generates the read address ADR_R2 by performing an address switching process on the basis of the read address ADR_R1 and performs the signal process corresponding to the address region to which that read address ADR_R1 belongs on the read data DATA_R2. This eliminates the necessity for a processing device to perform a signal process. It is thus possible to decrease processing loads on the processing device.

Modification Example 1-1

In the above-described embodiment, the control unit 13 manages each of the banks BK0 to BK3 in the DRAM 11 as illustrated in FIGS. 6A, 6B, 6C, and 6D, but this is not limitative. Instead of this, a control unit may bring the DRAM 11 into operation like a so-called FIFO (First In First Out) memory. The following describes an imaging device 10A according to the present modification example in detail. The imaging device 10A includes a control unit 13A.

FIG. 19 illustrates an example of a memory map of the DRAM 11 according to the present modification example. In this example, the DRAM 11 is divided into a buffer area BFA and the work area WA. The buffer area BFA includes four buffers BF0 to BF3. Each of the four buffers BF0 to BF3 stores image data for one frame that is generated by the imaging unit 20.

The control unit 13A has functions of controlling a write operation and read operation of data by the memory control unit 12 as with the control unit 13 according to the above-described embodiment. The control unit 13A manages the buffers BF0 to BF3 in the DRAM 11 when controlling the operation of the memory control unit 12. Specifically, when the image data D1 supplied from the imaging unit 20 is stored in the DRAM 11, the control unit 13A sequentially selects the buffer BF in which image data for one frame included in the image data D1 is to be written among the buffers BF0 to BF3 and generates the write address corresponding to that buffer BF as with the control unit 13 according to the above-described embodiment. In addition, the control unit 13A sequentially selects the buffer BF from which image data is to be read among the buffers BF0 to BF3 and generates the read address corresponding to that buffer BF when reading the image data D1 from the DRAM 11.

FIGS. 20A, 20B, 20C, and 20D illustrate operation examples of the memory control unit 12 and control unit 13A. FIGS. 20A, 20B, 20C, and 20D respectively illustrate write operations and read operations for the buffers BF0 to BF3.

The control unit 13A sequentially selects the buffer BF in which image data for one frame included in the image data D1 is to be written among the buffers BF0 to BF3 and generates the write address. The memory control unit 12 then writes that image data for one frame in the selected buffer BF on the basis of the write address generated by the control unit 13A.

Specifically, the control unit 13A generates a write address for designating a memory region in the buffer BF0 from timing t21 to timing t22 (write period T10). The memory control unit 12 writes the image data for one frame in the buffer BF0 on the basis of this write address. The control unit 13A sets the buffer BF0 in a readable state at the timing at which this writing is completed. Next, the control unit 13A generates a write address for designating a memory region in the buffer BF1 from the timing t22 to timing t23 (write period T11). The memory control unit 12 writes the image data for the next one frame in the buffer BF1 on the basis of this write address. The control unit 13A sets the buffer BF1 in a readable state at the timing at which this writing is completed. Next, the control unit 13A generates a write address for designating a memory region in the buffer BF2 from the timing t23 to timing t24 (write period T12). The memory control unit 12 writes the image data for the next one frame in the buffer BF2 on the basis of this write address. The control unit 13A sets the buffer BF2 in a readable state at the timing at which this writing is completed. Next, the control unit 13A generates a write address for designating a memory region in the buffer BF3 from the timing t24 to timing t25 (write period T13). The memory control unit 12 writes the image data for the next one frame in the buffer BF3 on the basis of this write address. The control unit 13A sets the buffer BF3 in a readable state at the timing at which this writing is completed.

The control unit 13A then sequentially selects the buffer BF from which image data is to be read among the buffers BF0 to BF3 when reading the image data D1 from the DRAM 11. The output control unit 14 then generates the read address ADR_R2 on the basis of the read address ADR_R1 by using the pieces of information for the states of the buffers BF0 to BF3 that are supplied from the control unit 13A. The memory control unit 12 reads image data from the selected buffer BF on the basis of the read address ADR_R2.

Specifically, the output control unit 14 generates the read address ADR_R2 for designating a memory region in the buffer BF0 in a readable period T30 on the basis of the read address ADR_R1 by using pieces of information for the states of the buffers BF0 to BF3 that are supplied from the control unit 13A. The memory control unit 12 reads image data from the buffer BF0 in the read period T40 in this readable period T30. The control unit 13A sets the buffer BF0 in a writable state at the timing at which this reading is completed. Next, the output control unit 14 generates the read address ADR_R2 for designating a memory region in the buffer BF1 in a readable period T31 on the basis of the read address ADR_R1 by using pieces of information for the states of the buffers BF0 to BF3 that are supplied from the control unit 13A. The memory control unit 12 reads image data from the buffer BF1 in the read period T41 in this readable period T31. The control unit 13A sets the buffer BF1 in a writable state at the timing at which this reading is completed. Next, the output control unit 14 generates the read address ADR_R2 for designating a memory region in the buffer BF2 in a readable period T32 on the basis of the read address ADR_R1 by using pieces of information for the states of the buffers BF0 to BF3 that are supplied from the control unit 13A. The memory control unit 12 reads image data from the buffer BF2 in the read period T42 in this readable period T32. The control unit 13A sets the buffer BF2 in a writable state at the timing at which this reading is completed. Next, the output control unit 14 generates the read address ADR_R2 for designating a memory region in the buffer BF3 in a readable period T33 on the basis of the read address ADR_R1 by using pieces of information for the states of the buffers BF0 to BF3 that are supplied from the control unit 13A. The memory control unit 12 reads image data from the buffer BF3 in the read period T43 in this readable period T33. The control unit 13A sets the buffer BF3 in a writable state at the timing at which this reading is completed. [Modification Example 1-2]

In the above-described embodiment, the processing device 30 transmits the control information CTL to the imaging device 10, but this is not limitative. The imaging device 10 may also transmit control information to the processing device 30. Specifically, the control unit 13 may generate an interrupt signal and allow the bus interface (bus I/F) 15 to transmit control information including this interrupt signal to the processing device 30. For example, the control unit 13 is able to generate an interrupt signal on the basis of information for the state of each of the banks BK0 to BK3, the temperature of the imaging device 10, the operation state, or the like. This allows the processing device 30 operating as a master to control, for example, the operation of the imaging device 10 on the basis of an interrupt signal transmitted from the imaging device 10.

2. Second Embodiment

Next, an imaging system 2 according to a second embodiment is described. In the present embodiment, an imaging device operates as a master and a processing device operates as a slave. It is to be noted that components substantially the same as those of the imaging system 1 according to the above-described first embodiment are provided with the same signs, and description thereof is omitted where appropriate.

FIG. 21 illustrates a configuration example of the imaging system 2 including an imaging device 50 according to a second embodiment. The imaging system 2 includes the imaging device 50, a processing device 60, and the DRAM 40. The imaging device 50 and the processing device 60 are coupled to each other via a bus 200. The bus 200 transmits the read address ADR_R, the read data DATA_R, the write address ADR_W, the write data DATA_W, and the control information CTL. In this example, the imaging device 50 operates as a master and the processing device 60 operates as a slave.

The read address ADR_R is a logical address for designating a memory region in the DRAM 40 in which data is written in a case where data such as image data read from the DRAM 11 of the imaging device 50 is written in the DRAM 40 coupled to the processing device 60. The read address ADR_R is an address in a memory map managed by the imaging device 50 operating as a master. In addition, the read address ADR_R also functions as an address for designating a memory region in the DRAM 40 in which data is written in a case where data read from the register 19 of the imaging device 50 is written in the DRAM 40 coupled to the processing device 60. The imaging device 50 transmits the read address ADR_R to the processing device 60. The read data DATA_R is data read from the DRAM 11 or register 19 of the imaging device 10. The imaging device 50 transmits this read data DATA_R to the processing device 60.

The write address ADR_W is a logical address for designating a memory region in the DRAM 40 from which data is read in a case where data read from the DRAM 40 coupled to the processing device 60 is written in the DRAM 11 of the imaging device 50. The write address ADR_W is an address in a memory map managed by the imaging device 50 operating as a master. In addition, the write address ADR_W also functions as an address for designating a memory region in the DRAM 40 from which data is read in a case where data read from the DRAM 40 coupled to the processing device 60 is written in the register 19 of the imaging device 50. The imaging device 50 transmits the write address ADR_W to the processing device 60. The write data DATA_W is data written in the DRAM 11 or register 19 of the imaging device 50. The processing device 60 transmits this write data DATA_W to the imaging device 50.

The control information CTL is information transmitted by the imaging device 50 to the processing device 60. The control information CTL includes, for example, identification information such as an identifier for identifying the imaging device 50 or the processing device 60, control information such as chip select (Chip Select), write enable (Write Enable), or read enable (Read Enable), and additional information such as the number of bytes of data written in the DRAM 11 of the imaging device 10 by using the one write address ADR_W or the number of bytes of data read from the DRAM 11 of the imaging device 10 by using the one read address ADR_R.

With this configuration, the imaging device 50 performs an imaging operation to generate image data and writes this image data in the DRAM 11 in the imaging system 2. The imaging device 50 then reads this image data from the DRAM 11 and transmits the read address ADR_R and the read data DATA_R to the processing device 60. The processing device 60 then writes the data indicated by that read data DATA_R in the memory region of the DRAM 40 corresponding to that read address ADR_R. In addition, in the imaging system 2, the imaging device 50 transmits the write address ADR_W to the processing device 60. The processing device 60 reads data from the memory region of the DRAM 40 corresponding to that write address ADR_W and transmits the read data to the imaging device 50 as the write data DATA_W. The imaging device 50 writes the data indicated by this write data DATA_W in the DRAM 11. In this way, the use of the bus 200 allows the imaging system 2 to bidirectionally transmit and receive data.

FIG. 22 illustrates a configuration example of the imaging device 50. The imaging device 50 includes a DMA (Direct Memory Access) controller 56, a bus interface (bus I/F) 55, a control unit 53, and an image analysis unit 57.

The DMA controller 56 controls data transfer between the imaging device 50 and the processing device 60.

In a case where data such as image data is transferred from the processing device 60 to the imaging device 50, the DMA controller 56 generates a read address ADR_R0 that is a logical address and the read address ADR_R that is a logical address. The read address ADR_R0 designates a memory region in the DRAM 11 of the imaging device 50. The read address ADR_R designates a memory region in the DRAM 40 coupled to the processing device 60. The DMA controller 56 then supplies these read address ADR_R1 and read address ADR_R to the bus interface (bus I/F) 55.

In addition, in a case where data is transferred from the processing device 60 to the imaging device 50, the DMA controller 56 generates the write address ADR_W1 that is a logical address and the write address ADR_W that is a logical address. The write address ADR_W1 designates a memory region in the DRAM 11 of the imaging device 50. The write address ADR_W designates a memory region in the DRAM 40 coupled to the processing device 60. The DMA controller 56 then supplies these write address ADR_W1 and write address ADR_W to the bus interface (bus I/F).

The bus interface (bus I/F) 55 is an interface for the bus 200 in the imaging device 50.

In a case where the read address ADR_R0 supplied from the DMA controller 56 is an address for an instruction of access to the DRAM 11, the bus interface 55 converts a memory map on the basis of this read address ADR_R0, thereby generating the read address ADR_R1 that is an internal address (physical address) used in the imaging device 50. In addition, the bus interface 55 transmits the read address ADR_R supplied from the DMA controller 56 to the processing device 60. In addition, the bus interface 55 converts a data format on the basis of read data DATA_R1 supplied from the output control unit 14, thereby generating the read data DATA_R.

In addition, in a case where the write address ADR_W0 supplied from the DMA controller 56 is an address for an instruction of access to the DRAM 11, the bus interface 55 converts a memory map on the basis of this write address ADR_W0, thereby generating the write address ADR_W1 that is an internal address (physical address) used in the imaging device 50. In addition, the bus interface 55 transmits the write address ADR_W supplied from the DMA controller 56 to the processing device 60. In addition, the bus interface 55 converts a data format on the basis of the write data DATA_W transmitted from the processing device 60, thereby generating the write data DATA_W1.

In addition, in a case where the read address ADR_R0 supplied from the DMA controller 56 is an address for an instruction of access to the register 19, the bus interface 55 converts a memory map on the basis of this read address ADR_R0, thereby generating the register address RADR. This causes the register 19 to read data on the basis of the register address RADR and supply the read data to the bus interface 55. In addition, the bus interface 55 converts a data format on the basis of the register read data RDATA_R supplied from the register 19, thereby generating the read data DATA_R.

In addition, in a case where the write address ADR_W0 supplied from the DMA controller 56 is an address for an instruction of access to the register 19, the bus interface 55 converts a memory map on the basis of this write address ADR_W0, thereby generating the register address RADR. In addition, the bus interface 55 converts a data format on the basis of the write data DATA_W transmitted from the processing device 60, thereby generating the register write data RDATA_W. This causes the register 19 to store the data indicated by the register write data RDATA_W on the basis of the register address RADR.

In addition, the bus interface 55 has functions of generating the control information CTL on the basis of information supplied from the DMA controller 56 and transmitting this control information CTL to the processing device 60.

The control unit 53 controls the operation of the imaging device 50 as with the control unit 13 according to the first embodiment.

The image analysis unit 57 performs, for example, image analysis processes such as a motion detection process and a face detection process on the basis of image data.

Here, the bus interface 55 corresponds to a specific example of the "bus interface" in the present disclosure. The DMA controller 56 corresponds to a specific example of a "transfer control unit" in the present disclosure. The image analysis unit 57 corresponds to a specific example of an "image analysis unit" in the present disclosure.

FIG. 23 illustrates an example of the operation for writing the image data D1 supplied from the imaging unit 20 in the bank area BKA of the DRAM 11. The dashed arrow indicates the path of a write address and the solid arrow indicates the path of the image data D1.

The control unit 53 controls the imaging operation of the imaging unit 20. The imaging unit 20 performs an imaging operation on the basis of an instruction from the control unit 53, thereby generating the image data D1. The imaging unit 20 supplies the generated image data D1 to the memory control unit 12. In addition, the control unit 53 sequentially selects the bank BK in which image data for one frame included in the image data D1 is to be written among the banks BK0 to BK3. The control unit 53 then generates the write address corresponding to the selected bank BK and supplies that write address to the memory control unit 12. The memory control unit 12 writes image data for one frame in the selected bank BK in the DRAM 11 on the basis of the write address supplied from the control unit 53 and the image data D1 supplied from the imaging unit 20.

FIG. 24 illustrates an example of the operation for reading image data from the bank area BKA of the DRAM 11. The dashed arrow indicates the path of a read address and the solid arrow indicates the path of image data read from the DRAM 11.

The DMA controller 56 generates the read address ADR_R0 and the read address ADR_R. The bus interface (bus I/F) 55 converts a memory map on the basis of the read address ADR_R0 transmitted from the DMA controller 56, thereby generating the read address ADR_R1 that is an internal address (physical address) used in the imaging device 50. The output control unit 14 generates the read address ADR_R2 on the basis of the read address ADR_R1 supplied from the bus interface 55. The read address ADR_R1 is then an address for designating a memory region in the bank area BKA of the DRAM 11. The output control unit 14 thus generates a read address on the basis of the read address ADR_R1 by using the pieces of information for the states of the banks BK0 to BK3 that are supplied from the control unit 53. In addition, the output control unit 14 further performs an address switching process to generate the read address ADR_R2 on the basis of this read address. The memory control unit 12 reads image data from the DRAM 11 on the basis of this read address ADR_R2 and supplies the read image data to the output control unit 14 as the read data DATA_R2. The output control unit 14 generates the read data DATA_R1 by performing the signal process corresponding to the address region X1, X2, or X3 to which the read address ADR_R1 supplied from the bus interface 55 belongs on the read data DATA_R2. The bus interface 55 converts a data format on the basis of this read data DATA_R1, thereby generating the read data DATA_R. The bus interface 55 transmits this read data DATA_R to the processing device 60. In addition, the bus interface 55 transmits the read address ADR_R supplied from the DMA controller 56 to the processing device 60.

FIG. 25 illustrates an operation example of the imaging system 2 in a case where image data read from the bank area BKA of the DRAM 11 is transmitted to the processing device 60. The bus interface 55 of the imaging device 50 transmits the read address ADR_R and the read data DATA_R to the processing device 60. The processing device 60 writes image data in the DRAM 40 on the basis of these read address ADR_R and read data DATA_R.

FIGS. 26A and 26B illustrate the operation for transmitting the image data of a partial image of a frame image to be read to the processing device 60. FIG. 26A illustrates a memory map of internal addresses (physical addresses) in the imaging device 50. FIG. 26B illustrates a memory map for a logical address. For example, the image analysis unit 57 of the imaging device 50 performs an image analysis process to decide the position and size of an image region for a partial image of a frame image to be read. The DMA controller 56 then generates the read address ADR_R and the read address ADR_R0 on the basis of the decided image region. The imaging device 50 then reads the image data of the partial image (two partial images in this example) from the DRAM 11 on the basis of this read address ADR_R0. In this way, the imaging device 50 transmits the read address ADR_R and the read data DATA_R to the processing device 60. The processing device 60 writes image data in the DRAM 40 on the basis of these read address ADR_R and read data DATA_R. The imaging device 50 transmits the read address ADR_R to the imaging device 50. This makes it possible to designate a memory region in the DRAM 40 in which image data is written as illustrated in (B) of FIG. 26B.

It is to be noted that the image analysis unit 57 of the imaging device 50 decides the position and size of an image region for a partial image to be read in this example, but this is not limitative. Instead of this, for example, the image analysis unit 32 of the processing device 60 may decide the position and size of an image region for a partial image to be read and the processing device 60 may transmit control information including information for the decided image region to the imaging device 50.

FIG. 27 illustrates an example of the operation for writing data in the work area WA of the DRAM 11. The dashed arrow indicates the path of a write address and the solid arrow indicates the path of write data written in the DRAM 11.

The DMA controller 56 generates the write address ADR_W0 and the write address ADR_W. The bus interface 55 transmits the write address ADR_W supplied from the DMA controller 56 to the processing device 60. This causes the processing device 60 to read data from the DRAM 40 on the basis of this write address ADR_W and transmit the read data to the imaging device 50 as the write data DATA_W. The bus interface 55 converts a data format on the basis of the write data DATA_W transmitted from the processing device 60, thereby generating the write data DATA_W1. In addition, the bus interface (bus I/F) 55 converts a memory map on the basis of the write address ADR_W0 supplied from the DMA controller 56, thereby generating the write address ADR_W1 that is an internal address (physical address) used in the imaging device 50. The memory control unit 12 then writes data in the work area WA of the DRAM 11 on the basis of these write address ADR_W1 and write data DATA_W1.

FIG. 28 illustrates an operation example of the imaging system 2 in a case where data read from the DRAM 40 coupled to the processing device 60 is written in the work area WA of the DRAM 11. The bus interface 55 of the imaging device 50 transmits the read address ADR_R to the processing device 60. The processing device 60 reads data from the DRAM 40 on the basis of this write address ADR_W and transmits the read data to the imaging device 50 as the write data DATA_W. The imaging device 50 writes data in the DRAM 11 on the basis of this write data DATA_W.

FIGS. 29A and 29B, illustrate the operation for transmitting image data that is RAW data to the imaging device 50. FIG. 29A illustrates a memory map of internal addresses (physical addresses) in the imaging device 50. FIG. 29B illustrates a memory map for a logical address. The imaging device 50 transmits the read address ADR_R to the processing device 60. The processing device 60 reads image data that is RAW data from the DRAM 40 on the basis of this read address ADR_R and transmits the read image data to the imaging device 50 as the write data DATA_W. The imaging device 50 the writes data in the DRAM 11 on the basis of this write data DATA_W. The imaging device 50 transmits the read address ADR_R to the processing device 60. This makes it possible to designate a memory region in the DRAM 40 from which image data is read as illustrated in FIG. 29B.

The image data written in the DRAM 11 of the imaging device 50 may be then read from the DRAM 11 and transmitted to the processing device 60. When the image data is read from the DRAM 11, the output control unit 14 is configured to perform the signal process illustrated in FIGS. 16 to 18. For example, in a case where the output control unit 14 performs the signal process illustrated in FIG. 16, the processing device 60 is able to obtain image data in the planar format. In addition, for example, in a case where the output control unit 14 performs the signal process illustrated in FIG. 17, the processing device 60 is able to obtain image data subjected to a filter process.

The operation for reading image data from the work area WA of the DRAM 11 is similar to the operation for reading image data from the bank area BKA of the DRAM 11 (FIG. 24). In this case, the read address ADR_R1 is not an address for designating a memory region in the bank area BKA of the DRAM 11. The output control unit 14 thus generates the read address ADR_R2 without using the pieces of information for the states of the banks BK0 to BK3 that are supplied from the control unit 53.

As described above, the imaging device 50 transmits the read address ADR_R and the read data DATA_R to the processing device 60 and the processing device 60 writes image data in the DRAM 40 on the basis of the read address ADR_R and the read data DATA_R. This allows the imaging device 50 to transmit the image data of a partial image of a frame image to be read alone to the processing device 60. It is thus possible to suppress the amount of data transferred by the bus 200.

That is, for example, in a case where an imaging device transmits the image data of a frame image to a processing device and the processing device extracts a partial image to be read from the frame image on the basis of this image data, the bus 200 may transfer a large amount of data. In addition, the processing device may also have a large number of processing loads. In contrast, the imaging device 50 is able to transmit the image data of a partial image of a frame image to be read alone to the processing device 60. It is thus possible to suppress the amount of data transferred by the bus 200. In addition, it is possible to decrease processing loads on the processing device 60.

Especially in the imaging device 50, the image analysis unit 57 of the imaging device 50 performs an image analysis process to decide the position and size of an image region for a partial image of a frame image to be read and the DMA controller 56 generates the read address ADR_R and the read address ADR_R0 on the basis of the decided image region. This makes it possible to suppress the amount of data transferred by the bus 200 and decrease processing loads on the processing device 60.

In addition, the imaging device 50 transmits the read address ADR_R to the processing device 60 and designates a memory region of the DRAM 40 coupled to the processing device 60. This allows the imaging device 50 to control a transfer operation by the imaging system 2. It is thus possible to increase the degree of operation freedom.

As described above, in the present embodiment, an imaging device transmits the read address ADR_R and the read data DATA_R to a processing device and the processing device writes image data in the DRAM 40 on the basis of the read address ADR_R and the read data DATA_R. This makes it possible to suppress the amount of data transferred by a bus.

In the present embodiment, an imaging device transmits the read address ADR_R to a processing device and designates a memory region of the DRAM 40 coupled to the processing device. This makes it possible to increase the degree of operation freedom.

The other effects are similar to those of the above-described first embodiment.

Modification Example 2

Each of the modification examples of the above-described first embodiment may be applied to the imaging system 2 according to the above-described embodiment.

3. Application Examples

Next, application examples of the imaging system according to the above-described embodiment are described.

Application Example 3-1

FIG. 30 illustrates a configuration example of an imaging system 3 that performs object detection. The imaging system 3 includes the imaging device 50 and the processing device 60. The imaging device 50 operates as a master and the processing device 60 operates as a slave. The image analysis unit 57 of the imaging device 50 includes an object detection section 57A. The object detection section 57A performs a template matching process on the basis of a template image PIC1 and a captured image PIC2, thereby performing object detection. The template image PIC1 indicates an object to be detected. The captured image PIC2 is obtained through an imaging operation.

In this example, first, the imaging device 50 receives the image data of the template image PIC1 stored in the DRAM 40 coupled to the processing device 60 from the processing device 60 and writes that image data in the work area WA of the DRAM 11. Specifically, the bus interface (bus I/F) 55 of the imaging device 50 transmits the write address ADR_W to the processing device 60. The processing device 60 reads the image data of the template image PIC1 from the DRAM 40 on the basis of this write address ADR_W and transmits this image data to the imaging device 50 as the write data DATA_W. The imaging device 50 then writes the image data of the template image PICT in the work area WA of the DRAM 11 on the basis of this write data DATA_W.

The imaging unit 20 of the imaging device 50 performs an imaging operation to generate the image data of the captured image PIC2. The imaging device 50 then writes this image data in the DRAM 11.

The object detection section 57A performs a template matching process on the basis of the template image PIC1 and the captured image PIC2, thereby performing object detection. Specifically, as illustrated in FIG. 31, the object detection section 57A performs a template matching process on the basis of the image data of the template image PIC1 stored in the work area WA of the DRAM 11 and the image data of the captured image PIC2 stored in the bank area BKA. Then, in a case where the captured image PIC2 includes an object to be detected, the object detection section 57A supplies the DMA controller 56 with coordinate information INF for the position and size of a partial image for the object to be detected.

The DMA controller 56 generates the read address ADR_R0 on the basis of this coordinate information INF and generates the read address ADR_R. The imaging device 50 reads the image data of the partial image for the object to be detected that is included in the captured image PIC2 from the bank area BKA of the DRAM 11 on the basis of the read address ADR_R0. The imaging device 50 then transmits the image data of that partial image to the processing device 60 as the read data DATA_R along with the read address ADR_R. The processing device 60 writes the image data of the partial image in the DRAM 40 on the basis of these read address ADR_R and read data DATA_R.

In this example, the imaging device 50 reads the image data of a partial image for an object to be detected that is included in the captured image PIC2 from the DRAM 11 and transmits this image data to the processing device 60, but this is not limitative. For example, the imaging device 50 may write the coordinate information INF generated by the object detection section 57A in the work area WA of the DRAM 11 and read the image data of the captured image PIC2 and this coordinate information INF from this DRAM 11 for transmission to the processing device 60. In this case, the processing device 60 is able to extract a partial image from the captured image PIC2 on the basis of the coordinate information INF. Further, the imaging device 50 may transmit a notification indicating that the captured image PIC2 includes an object to be detected to the processing device 60.

In addition, in this example, the imaging device 50 operating as a master and the processing device 60 operating as a slave are used, but this is not limitative. Instead of this, for example, the imaging device 10 operating as a slave and the processing device 30 operating as a master may be used. In this case, the imaging device 10 may include the object detection section 57A as with the imaging device 50. The imaging device 10 may write the coordinate information INF generated by this object detection section 57A in the work area WA of the DRAM 11 and read the image data of the captured image PIC2 and this coordinate information INF from the DRAM 11 for transmission to the processing device 60.

Application Example 3-2

FIG. 32 illustrates a configuration example of an imaging system 4 that performs stereo distance measurement. The imaging system 4 includes the imaging devices 10 and 50 and the processing device 60. The imaging device 50 operates as a master and the imaging device 10 and the processing device 60 operate as slaves. The imaging unit 20 of the imaging device 50 and the imaging unit 20 of the imaging device 10 are disposed side by side, for example, in the horizontal direction. This causes the imaging unit 20 of the imaging device 50 to perform an imaging operation to generate the image data of a left-eye image PIC3 and causes the imaging unit 20 of the imaging device 10 to perform an imaging operation to generate the image data of a right-eye image PIC4 in this example. The left-eye image PIC3 and the right-eye image PIC4 are included in a parallax image. The image analysis unit 57 of the imaging device 50 includes a parallax distance measurement section 57B. The parallax distance measurement section 57B performs a stereo distance measurement process on the basis of the left-eye image PIC3 and the right-eye image PIC4, thereby generating a distance image PIC5. The distance image PIC5 includes a plurality of pixel values indicating distance.

The imaging unit 20 of the imaging device 50 first performs an imaging operation to generate the image data of the left-eye image PIC3 and the imaging unit 20 of the imaging device 10 performs an imaging operation to generate the image data of the right-eye image PIC4 in this example.

The imaging device 50 then receives the image data of the right-eye image PIC4 from the imaging device 10 and writes the image data of the right-eye image PIC4 in the work area WA of the DRAM 11 of the imaging device 50. Specifically, the bus interface (bus I/F) 55 of the imaging device 50 transmits the write address ADR_W to the imaging device 10. The imaging device 10 reads the image data of the right-eye image PIC4 from the DRAM 11 of the imaging device 10 on the basis of this write address ADR_W and transmits this image data to the imaging device 50 as the write data DATA_W. The imaging device 50 then writes the image data of the right-eye image PIC4 in the work area WA of the DRAM 11 of the imaging device 50 on the basis of this write data DATA_W.

The parallax distance measurement section 57B performs a stereo distance measurement process on the basis of the left-eye image PIC3 and the right-eye image PIC4, thereby generating the distance image PIC5. Specifically, as illustrated in FIG. 33, the parallax distance measurement section 57B performs a stereo distance measurement process on the basis of the image data of the left-eye image PIC3 stored in the bank area BKA of the DRAM 11 and the image data of the right-eye image PIC4 stored in the work area WA of the DRAM 11, thereby generating the distance image PIC5. The imaging device 50 writes the distance image PIC5 generated by the parallax distance measurement section 57B in the work area WA of the DRAM 11 of the imaging device 50.

The DMA controller 56 generates the read address ADR_R0 and the read address ADR_R. The imaging device 50 reads the image data of the distance image PIC5 from the DRAM 11 on the basis of the read address ADR_R0 and transmits this image data to the processing device 60 as the read data DATA_R along with the read address ADR_R. The processing device 60 writes the image data of the distance image PIC5 in the DRAM 40 on the basis of these read address ADR_R and read data DATA_R.

In this example, an imaging device that communicates with the processing device 60 operates as a master, but this is not limitative. Instead of this, for example, an imaging device that communicates with a processing device may operate as a slave as in an imaging system 5. This imaging system 5 includes the imaging devices 10 and 50 and the processing device 30. The imaging device 50 and the processing device 60 operate as masters and the imaging device 10 operates as a slave. The imaging unit 20 of the imaging device 10 performs an imaging operation to generate the image data of the left-eye image PIC3 and the imaging unit 20 of the imaging device 50 performs an imaging operation to generate the image data of the right-eye image PIC4 in this example. The imaging device 10 includes the image analysis unit 57. The image analysis unit 57 includes the parallax distance measurement section 57B.

The imaging unit 20 of the imaging device 10 first performs an imaging operation to generate the image data of the left-eye image PIC3 and the imaging unit 20 of the imaging device 50 performs an imaging operation to generate the image data of the right-eye image PIC4 in this example.

The imaging device 50 then transmits the write address ADR_W and the write data DATA_W to the imaging device 10 to transmit the image data of the right-eye image PIC4. The imaging device 10 writes the image data of the left-eye image PIC3 in the work area WA of the DRAM 11 of the imaging device 10 on the basis of these write address ADR_W and write data DATA_W.

The parallax distance measurement section 57B of the imaging device 10 performs a stereo distance measurement process on the basis of the left-eye image PIC3 and the right-eye image PIC4, thereby generating the distance image PIC5. The imaging device 10 writes the distance image PIC5 generated by the parallax distance measurement section 57B in the work area WA of the DRAM 11 of the imaging device 50.

The processing device 30 receives the image data of the distance image PIC5 from the imaging device 10 and writes this image data in the DRAM 40 coupled to the processing device 30. Specifically, the processing device 30 transmits the read address ADR_R to the imaging device 10. The imaging device 10 reads the image data of the distance image PIC5 from the work area WA of the DRAM 11 on the basis of this read address ADR_R and transmits this image data to the processing device 30 as the read data DATA_R. The processing device 30 writes the image data of the distance image PIC5 in the DRAM 40 on the basis of this read data DATA_R.

4. Usage Example of Imaging Device

FIG. 35 illustrates a usage example of the imaging system 1 or the like according to the above-described embodiment.

For example, the above-described imaging device 1 or the like is usable in a variety of cases of sensing light such as visible light, infrared light, ultraviolet light, and X-ray as follows.

- Devices that shoot images used for viewing such as digital cameras and portable appliances each having a camera function
- Devices for traffic use such as onboard sensors that shoot images of the front, back, surroundings, inside, and so on of an automobile for safe driving such as automatic stop and for recognition of a driver's state, monitoring cameras that monitor traveling vehicles and roads, and distance measuring sensors that measure vehicle-to-vehicle distance
- Devices for use in home electrical appliances such as televisions, refrigerators, and air-conditioners to shoot images of a user's gesture and bring the appliances into operation in accordance with the gesture
- Devices for medical care and health care use such as endoscopes and devices that shoot images of blood vessels by receiving infrared light
- Devices for security use such as monitoring cameras for crime prevention and cameras for individual authentication
- Devices for beauty use such as skin measuring devices that shoot images of skin and microscopes that shoot images of scalp
- Devices for sports use such as action cameras and wearable cameras for sports applications, etc.
- Devices for agricultural use such as cameras for monitoring fields and crops 5. Example of Application to Mobile Body The technology (the present technology) according to the present disclosure is applicable to various products. For example, the technology according to the present disclosure may be achieved as a device mounted on any type of mobile body such as an automobile, an electric vehicle, a hybrid electric vehicle, a motorcycle, a bicycle, a personal mobility, an airplane, a drone, a vessel, or a robot.

FIG. 36 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 36, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automatic driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 36, an audio speaker 12061, a display section 12062, and an instrument panel 12063 are illustrated as the output device. The display section 12062 may, for example, include at least one of an on-board display and a head-up display.

FIG. 37 is a diagram depicting an example of the installation position of the imaging section 12031.

In FIG. 37, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 37 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automatic driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

The above has described the example of the vehicle control system to which the technology according to the present disclosure may be applied. The technology related to the present disclosure may be applied, for example, to the imaging section 12031 and the outside-vehicle information detecting unit 12030 of the above-described components. This allows the vehicle control system 12000 to reduce the possibility that a portion of information transmitted from the imaging section 12031 is missing, for example, even in a case where the outside-vehicle information detecting unit 12030 has increased processing loads. This allows the outside-vehicle information to be more certainly detected. In addition, for example, in a case where an object detection process is performed to detect a person, a vehicle, an obstacle, a sign, a character on the road, or the like, the outside-vehicle information detecting unit 12030 is able to obtain a partial image of a frame image alone that includes an object to be detected. It is thus possible to decrease processing loads.

The above has described the present technology with reference to some embodiments, modification examples, and specific application examples thereof, but the present technology is not limited to these embodiments or the like. A variety of modifications are possible.

For example, in the above-described respective embodiments, the imaging devices 10 and 50 are each provided with DRAM (DRAM 11), but this is not limitative. Instead of this, for example, SRAM (Static Random Access Memory) may be provided.

It is to be noted that the effects described in the present specification are merely illustrative, but not limited. In addition, other effects may be included.

It is to be noted that the present technology may be configured as below.

(1) An imaging device including:

a plurality of pixels formed in any of a plurality of semiconductor substrates that is stacked, the plurality of pixels being each configured to perform photoelectric conversion;

a memory unit formed in any of the plurality of semiconductor substrates, the memory unit being configured to store image data generated on the basis of a result of the photoelectric conversion;

a memory control unit formed in any of the plurality of semiconductor substrates, the memory control unit being configured to perform a read operation on the basis of first internal address information, the read operation being for reading, from the memory unit, image data corresponding to the first internal address information among pieces of the image data; and a bus interface formed in any of the plurality of semiconductor substrates, the bus interface being configured to perform communication for first address information with an external device, supply the memory control unit with the first internal address information, and transmit the image data read by the memory control unit to the external device.

(2) The imaging device according to (1), in which the bus interface is configured to receive the first address information from the external device and convert the first address information to the first internal address information.

(3) The imaging device according to (1), further including a transfer control unit configured to generate the first address information and address information, the address information corresponding to the first internal address information, in which the bus interface is configured to transmit the first address information to the external device and convert address information corresponding to the first address information to the first address information.

(4) The imaging device according to (2) or (3), in which the memory unit is configured to store the pieces of image data for a plurality of frames, and the image data corresponding to the first internal address information is less than image data for one frame.

(5) The imaging device according to any of (1) to (4), in which the bus interface is configured to supply the memory control unit with a plurality of pieces of the first internal address information, and the read operation is for reading image data for one frame on the basis of the plurality of first internal addresses.

(6) The imaging device according to any of (1) to (4), in which the bus interface is configured to supply the memory control unit with a plurality of pieces of the first internal address information, and the read operation is for reading pieces of image data corresponding to one or more partial images in image data for one frame on the basis of the plurality of first internal addresses.

(7) The imaging device according to (6), in which the bus interface is configured to designate one or more of a number of the partial images to be read, positions of the respective partial images in a frame image, and sizes of the respective partial images by using the plurality of first internal addresses.

(8) The imaging device according to any of (1) to (7), in which the bus interface is configured to control an operation for transferring the image data to the external device by controlling the read operation by using the plurality of first internal addresses.

(9) The imaging device according to any of (1) to (8), further including a signal processing unit configured to perform a signal process corresponding to the first internal address information among a plurality of signal processes on the basis of the image data stored in the memory unit, in which the bus interface is configured to designate, by using the first internal address information, a signal process to be performed by the signal processing unit.

(10) The imaging device according to (9), in which an address space for defining the first internal address information includes a plurality of address regions associated with a physical address region of the memory unit, the plurality of address regions is associated with the plurality of respective signal processes, and the signal processing unit is configured to perform a signal process associated with an address region to which the first internal address information belongs among the plurality of address regions.

(11) The imaging device according to (9) or (10), in which the plurality of signal processes includes a first signal process and a second signal process, the image data includes a plurality of pixel values, the first signal process includes a process of sequentially extracting the pixel values from the plurality of pixel values in a first order, and the second signal process includes a process of sequentially extracting the pixel values from the plurality of pixel values in a second order different from the first order.

(12) The imaging device according to (11), in which the plurality of pixel values includes pixel values corresponding to a plurality of colors, a plurality of the pixel values extracted in the first order includes the pixel values corresponding to the plurality of colors, and a plurality of the pixel values extracted in the second order includes pixel values corresponding to one of the plurality of colors.

(13) The imaging device according to any of (9) to (12), in which the plurality of signal processes includes a third signal process, the image data includes a plurality of pixel values, and the third signal process includes a process of generating one pixel value on the basis of a predetermined number of pixel values included in the plurality of pixel values.

(14) The imaging device according to any of (1) to (13), in which the bus interface is configured to perform communication for second address information with the external device, receive data transmitted from the external device, and supply the memory control unit with second internal address information, and the memory control unit is configured to perform a write operation for writing the data received by the bus interface in the memory unit on the basis of the second internal address information.

(15) The imaging device according to (14), in which the memory control unit is configured to perform a read operation for reading the data stored in the memory unit on the basis of the first internal address information, and the bus interface is configured to transmit the data read by the memory control unit to the external device.

(16) The imaging device according to any of (1) to (15), further including an image analysis unit configured to perform an image analysis process on the basis of the image data stored in the memory unit, in which the memory unit is configured to store a processing result of the image analysis process, the memory control unit is configured to perform a read operation for reading the processing result stored in the memory unit on the basis of the first internal address information, and the bus interface is configured to transmit the processing result read by the memory control unit to the external device.

(17) The imaging device according to any of (1) to (16), further including a register, in which the bus interface is configured to receive imaging control information transmitted from the external device and supply the register with register address information, the register is configured to store the imaging control information on the basis of the register address information, and the plurality of pixels is configured to perform the photoelectric conversion on the basis of the imaging control information.

(18) The imaging device according to any of (1) to (17), in which the plurality of pixels is formed in a first semiconductor substrate of the plurality of semiconductor substrates, and the memory unit is formed in a second semiconductor substrate of the plurality of semiconductor substrates.

(19) The imaging device according to (18), in which the bus interface is formed in a third semiconductor substrate of the plurality of semiconductor substrates, and the first semiconductor substrate, the second semiconductor substrate, and the third semiconductor substrate are stacked in this order.

(20) The imaging device according to any of (1) to (19), in which the memory unit includes DRAM (Dynamic Random Access Memory).

This application claims the priority on the basis of Japanese Patent Application No. 2018-083165 filed on Apr. 24, 2018 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An imaging device, comprising:
a plurality of pixels in any one of a plurality of semiconductor substrates that is stacked, wherein each of the plurality of pixels is configured to execute photoelectric conversion;
a memory in any one of the plurality of semiconductor substrates, wherein the memory is configured to store a plurality of pieces of image data generated based on a result of the photoelectric conversion;
a memory control unit in any one of the plurality of semiconductor substrates, wherein
the memory control unit is configured to execute a first read operation based on first internal address information, and
the first read operation is executed to read, from the plurality of pieces of the image data stored in the memory, a piece of the image data corresponding to the first internal address information; and
a bus interface in any one of the plurality of semiconductor substrates, wherein the bus interface is configured to:
execute communication for first address information with an external device;
supply the memory control unit with the first internal address information; and
transmit, to the external device, the read piece of the image data corresponding to the first internal address information.

2. The imaging device according to claim 1, wherein the bus interface is further configured to:
receive the first address information from the external device; and
convert the first address information to the first internal address information.

3. The imaging device according to claim 1, further comprising a transfer control unit configured to generate the first address information and address information, wherein
the address information corresponds to the first internal address information, and
the bus interface is further configured to:
transmit the first address information to the external device; and
convert the address information to the first internal address information.

4. The imaging device according to claim 1, wherein
the memory is further configured to store the plurality of pieces of the image data for a plurality of frames of an image, and
an amount of the piece of the image data corresponding to the first internal address information is less than an amount of the image data for one frame of the plurality of frames.

5. The imaging device according to claim 1, wherein
the bus interface is further configured to supply the memory control unit with a plurality of pieces of the first internal address information, and
the first read operation is for read of the plurality of pieces of the image data for a frame of an image based on the plurality of pieces of the first internal address information.

6. The imaging device according to claim 1, wherein
the bus interface is further configured to supply the memory control unit with a plurality of pieces of the first internal address information,
the first read operation is for the read of the piece of the image data from the plurality of pieces of the image data for a frame of an image based on a piece of the first internal address information of the plurality of pieces of the first internal address information, and
the piece of the image data corresponds to a partial image of partial images of the frame.

7. The imaging device according to claim 6, wherein the bus interface is further configured to designate, based on the plurality of pieces of the first internal address information, at least one of a number of the partial images to be read, positions of the partial images in the frame, and sizes of the partial images.

8. The imaging device according to claim 1, wherein the bus interface is further configured to:
control the execution of the first read operation based on a plurality of pieces of the first internal address information; and
transmit the piece of the image data to the external device based on the control of the execution of the first read operation.

9. The imaging device according to claim 1, further comprising a signal processing unit configured to execute a signal process of a plurality of signal processes based on the piece of the image data stored in the memory, wherein
the signal process corresponds to the first internal address information, and
the bus interface is further configured to designate, based on the first internal address information, the signal process executed by the signal processing unit.

10. The imaging device according to claim 9, wherein
an address space that defines the first internal address information includes a plurality of address regions associated with a physical address region of the memory,
each of the plurality of address regions is associated with a respective signal process of the plurality of signal processes,
the signal processing unit is further configured to execute the signal process associated with an address region of the plurality of address regions, and
the first internal address information belongs to the address region.

11. The imaging device according to claim 9, wherein
the plurality of signal processes includes a first signal process and a second signal process,
the plurality of pieces of the image data includes a plurality of pixel values,
the first signal process is for sequential extraction of first pixel values from the plurality of pixel values in a first order, and
the second signal process is for sequential extraction of second pixel values from the plurality of pixel values in a second order different from the first order.

12. The imaging device according to claim 11, wherein
the plurality of pixel values corresponds to a plurality of colors,
the first pixel values extracted in the first order correspond to the plurality of colors, and
the second pixel values extracted in the second order correspond to one of the plurality of colors.

13. The imaging device according to claim 9, wherein
the plurality of signal processes includes a third signal process,
the plurality of pieces of the image data includes a plurality of pixel values, and
the third signal process is for generation of a pixel value of an image based on a specific number of pixel values in the plurality of pixel values.

14. The imaging device according to claim 1, wherein
the bus interface is further configured to:
execute communication for second address information with the external device;
receive data from the external device; and
supply the memory control unit with second internal address information, and
the memory control unit is further configured to execute, based on the second internal address information, a write operation to write the data in the memory.

15. The imaging device according to claim 14, wherein
the memory control unit is further configured to execute, based on the first internal address information, a second read operation to read the data stored in the memory, and
the bus interface is further configured to transmit the read data to the external device.

16. The imaging device according to claim 1, further comprising an image analysis unit configured to execute an image analysis process based on the piece of the image data stored in the memory, wherein
the memory is further configured to store a processing result of the image analysis process,
the memory control unit is further configured to execute, based on the first internal address information, a third read operation to read the processing result stored in the memory, and
the bus interface is further configured to transmit the read processing result to the external device.

17. The imaging device according to claim 1, further comprising a register, wherein
the bus interface is further configured to:
receive imaging control information from the external device; and
supply the register with register address information,
the register is configured to store the imaging control information based on the register address information, and
each of the plurality of pixels is further configured to execute the photoelectric conversion based on the imaging control information.

18. The imaging device according to claim 1, wherein
the plurality of pixels is in a first semiconductor substrate of the plurality of semiconductor substrates, and
the memory is in a second semiconductor substrate of the plurality of semiconductor substrates.

19. The imaging device according to claim 18, wherein
the bus interface is in a third semiconductor substrate of the plurality of semiconductor substrates, and
the first semiconductor substrate, the second semiconductor substrate, and the third semiconductor substrate are stacked in this order.

20. The imaging device according to claim 1, wherein the memory includes DRAM (Dynamic Random Access Memory).

21. An imaging device, comprising:
a plurality of pixels in any one of a plurality of semiconductor substrates, wherein each of the plurality of pixels is configured to execute photoelectric conversion for a frame of an image;

a memory in any one of the plurality of semiconductor substrates, wherein the memory is configured to store a plurality of pieces of image data generated based on a result of the photoelectric conversion for the frame;

a memory control unit in any one of the plurality of semiconductor substrates, wherein
- the memory control unit is configured to execute a read operation based on a piece of internal address information of a plurality of pieces of the internal address information,
- the read operation is executed to read, from the plurality of pieces of the image data stored in the memory, a piece of the image data for the frame, and
- the piece of the image data corresponds to the piece of the internal address information and a partial image of partial images of the frame; and a bus interface in any one of the plurality of semiconductor substrates, wherein the bus interface is configured to:
- execute communication for address information with an external device;
- supply the memory control unit with the plurality of pieces of the internal address information; and
- transmit, to the external device, the read piece of the image data corresponding to the piece of the internal address information.

* * * * *